United States Patent [19]

Sefton et al.

[11] Patent Number: 4,861,565
[45] Date of Patent: Aug. 29, 1989

[54] METHOD OF SEPARATELY RECOVERING METAL VALUES OF PETROLEUM REFINING CATALYST

[75] Inventors: Verner B. Sefton, Victoria, Canada; Robert Fox; William P. Lorenz, both of Arab, Ala.

[73] Assignee: The Hall Chemical Company, Wickliffe, Ohio

[21] Appl. No.: 7,199

[22] Filed: Jan. 27, 1987

[51] Int. Cl.$^4$ .................. C01G 31/00; C01G 39/00; C01G 51/00; C01G 53/00

[52] U.S. Cl. .................. 423/55; 75/101 R; 75/101 BE; 75/108; 75/119; 75/121; 423/53; 423/54; 423/62; 423/68; 423/132; 423/139; 423/150; 502/24; 502/27

[58] Field of Search .......... 502/24, 22, 27, 516; 423/53, 54, 55, 57, 63, 68, 112, 132, 56, 116, 495, 150, 62; 75/101 R, 121, 119, 101 BE

[56] References Cited

U.S. PATENT DOCUMENTS

| | | | |
|---|---|---|---|
| 1,778,083 | 10/1930 | Marburg | 423/132 |
| 1,904,582 | 4/1933 | Watts | 502/27 |
| 2,112,292 | 3/1938 | Jones | 423/57 |
| 2,642,401 | 6/1953 | Laurey | 502/24 |
| 2,863,761 | 12/1958 | Ashley et al. | 75/121 |
| 3,399,055 | 8/1968 | Ritcey et al. | 75/101 BE |
| 3,773,890 | 11/1973 | Fox et al. | 423/53 |
| 4,145,397 | 3/1979 | Toida et al. | 423/54 |
| 4,214,901 | 7/1980 | Michal et al. | 75/121 |
| 4,657,745 | 4/1987 | Hyatt | 502/27 |
| 4,666,685 | 5/1987 | Wiewiorski | 75/119 |

Primary Examiner—Paul E. Konopka
Attorney, Agent, or Firm—Schmeiser, Morelle & Watts

[57] ABSTRACT

Metal values including those of cobalt, vanadium, aluminum, molybdenum and tungsten are recovered from spent petroleum refining catalyst by acid leaching the metal values except those of molybdenum or tungsten, separating the resulting solution from the leach residue and selectively recovering the cobalt, vanadium and aluminum values from the solution and recovering the molybdenum and tungsten values from the leach residue.

12 Claims, 7 Drawing Sheets

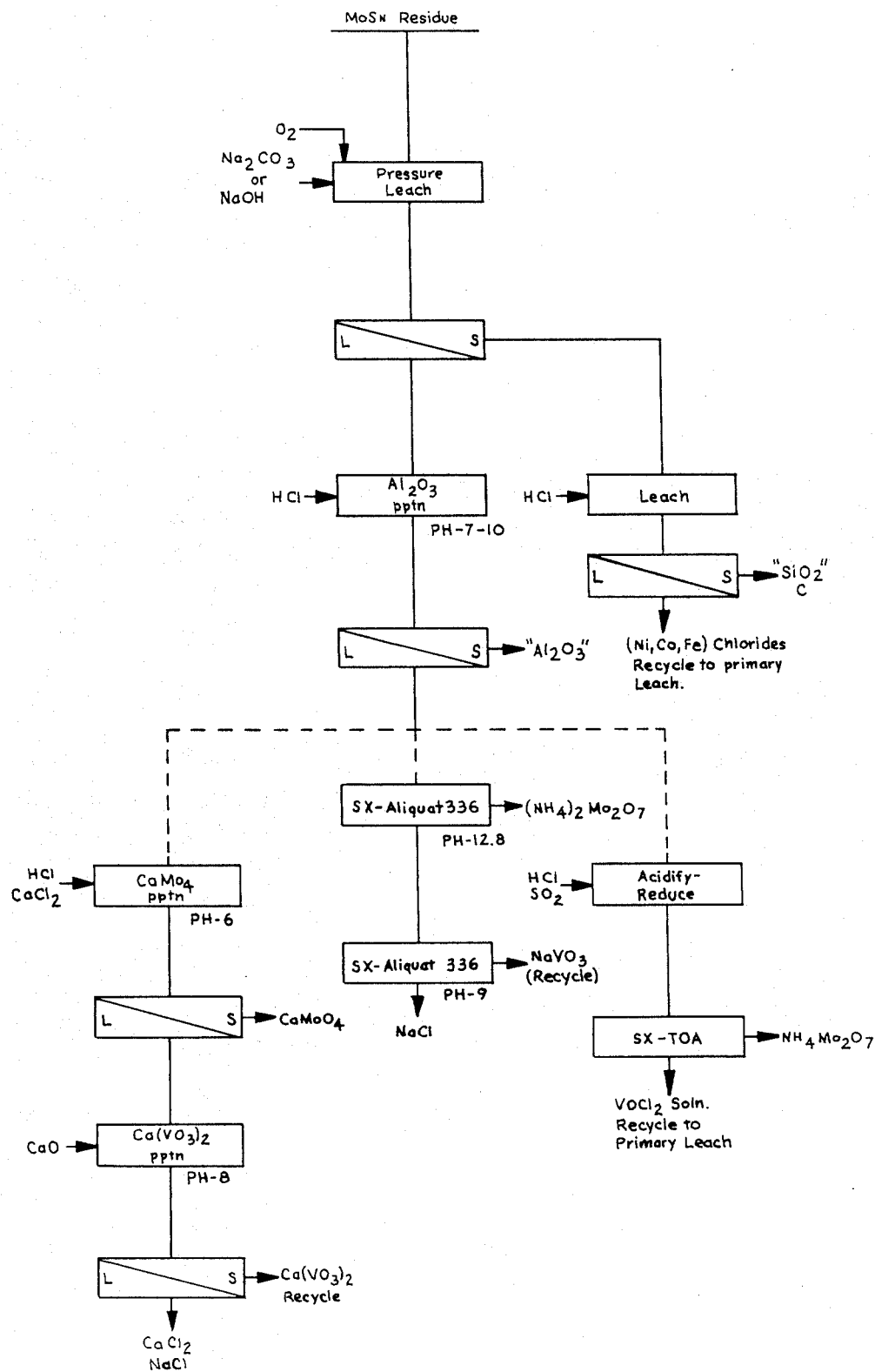

METHOD OF SEPARATELY RECOVERING METAL VALUES OF PETROLEUM REFINING CATALYST

FIELD OF THE INVENTION

This invention relates generally to the hydrometallurgical art and is more particularly concerned with a novel method of separately recovering metal values from hydrocracking and hydroprocessing catalyst such as spent hydrodesulfurization and hydrodemetallization catalyst.

BACKGROUND OF THE INVENTION

Sulfur and metal compounds removal in petroleum refining is accomplished with the aid of a catalyst of a Group VI B metal compound and an iron group metal compound on a support of porous refractory oxide material. A coating of oxides of cobalt or nickel and molybdenum or tungsten on gamma alumina particles, which are converted to sulfides prior to use, is the type and form of such hydrodesulfurization and hydrodemetallization catalysts long widely used in the industry. The rate of increase in catalyst consumption has grown with both the trend toward greater refining production volume and increasing use of high-sulfur/-high-metal crude oil and refinery feed stock. Resulting accumulation of such catalyst in spent condition has for some time been generally recognized to constitute an escalating solid toxic waste disposal problem.

The typical range of analysis for these spent catalysts is:

| Major Constituents | % |
| --- | --- |
| Mo | 0–10 |
| W | 0–15 |
| Ni | 0–3 |
| Co | 0–3 |
| V | 0–15 |
| Fe | 0–3 |
| $Al_2O_3$ | 30–60 |
| $SiO_2$ | 0–4 |
| $TiO_2$ | 0–5 |
| $P_2O_5$ | 0–5 |
| S total | 3–15 |
| Carbon total | 3–25 |
| Free Oil | 0–15 |
| Minor Constituents | P.P.M. |
| As | up to 2000 |
| Cu, Zn, Cr | up to 1000 |
| Pb, Mn | up to 500 |

The spent catalysts have also been seen as a potential major source of metal values, particularly cobalt, a strategic metal unavailable in necessary quantities from domestic or secure foreign primary sources. As a consequence, there have been many efforts by others for more than a decade to devise a solution to this problem either by decontaminating spent catalyst and restoring it to usable condition or by disintegrating it and recovering at least some of its metal values.

The large number of major and minor constituents in the spent catalyst, mostly which are soluble to some degree in conventional lixivants for selective leaching, make recovery of the commercially interesting metals (i.e. Mo, W, Ni, Co, V, Al) in pure compound form a very difficult task. To the best of our knowledge, only limited success along such lines has hitherto been achieved and this kind of waste product continues to accumulate for lack of an adequate commercially feasible means or procedure for treating it either for recovery or disposal.

SUMMARY OF THE INVENTION

By virtue of this invention, which is based upon our discoveries and new concepts set forth below, it is possible to recover separately the specially desirable metal values of spent hydrodesulfurization catalyst. Such selective recoveries, moreover, can be consistently and economically made with the result that high yields of molybdenum, or tungsten, cobalt, vanadium, nickel and aluminum may reasonably be expected in the routine practice of large-scale operations carried out in a manner consistent with normal chemical plant operations.

Another important advantage of this invention is the process choices afforded, particularly solvent extraction, selective precipitation and the combination of both procedures. Thus, depending upon type of catalyst feed, catalyst metal values content, desired purity of final or intermediate products, kind of equipment available and economic considerations, the operator can select the flowsheet process scheme best suiting his purposes.

One of our new concepts underlying this invention process is that the sequence of separation of the several metal values can have an important bearing upon the difficulty of their recovery and ultimate quality of the desired products. More specifically, by selectively leaching the catalyst substantially all the aluminum and vanadium and most of the nickel and cobalt can be dissolved into solution while substantially all the molybdenum and only minor levels of the other metal values will remain in the leach residue. This provides an effective method for separating molybdenum which is one of the primary constituents of value. If the catalyst contains tungsten in addition to or instead of molybdenum the tungsten will report to the leach residue and be recoverable in high yield.

We have found that such molybdenum separation can be made by leaching the catalyst with hydrochloric acid and thereby converting the cobalt, vanadium, nickel and aluminum to chlorides which are soluble in the acid solution while the molybdenum in original sulfide form remains insoluble and is readily removed as residue from the leach solution.

To avoid foaming difficulties during leaching, the catalyst can be retorted to remove adhering oil from the catalyst prior to leaching. Use of a sweep gas during retorting will facilitate oil removal; steam is the preferred sweep gas but other inert atmospheres such as nitrogen or combustion gas of low oxygen content are satisfactory. Dependent on the nature of the residual oil on the catalyst, a simple atmospheric steaming or alkali wash of the raw catalyst will also de-oil the catalyst to sufficient degree that foaming during leaching is not a difficulty.

Another concept of ours is the recovery of the molybdenum in the leach residue. We have found that this can be done efficiently and effectively by roasting the molybdenum-containing residue to convert the sulfides to soluble oxides and contacting the resulting calcine with a hydrochloric acid solution to dissolve substantially all the molybdenum in the calcine. The insoluble fraction consisting mainly of silica is removed from this second leach solution and discarded. The soluble molybdenum can be recovered from the second leach solution by means of solvent extraction or by selective precipitation as molybdic oxide. If solvent extraction is the step used, the molybdenum can be ultimately recovered as molybdic oxide or ammonium molybdate by appropriate stripping with water or ammonia. The molybdenum-free raffinate, containing small amounts of other metals originally present in the catalyst, is preferably returned to the initial leaching stage of the process. As an alternative, for recovery of molybdenum from the initial leach residue, the residue may be subjected to a pressure oxidizing leach under alkaline conditions to dissolve the molybdenum as molybdate and convert sulfide to soluble sulfate. Known techniques can then be used to recover the molybdenum values from the resulting solution.

Still another of our new concepts is to remove the cobalt and iron as ferrous iron together from the first leach solution by solvent extraction and then to oxidize the iron and remove it from the cobalt-containing strip solution. Again, we have established that these two metal values can be taken out together by solvent extraction with high efficiency and have further found that any common oxidizing agent such as sodium chlorate, chlorine or hydrogen peroxide will selectively convert all the iron in the solution to the trivalent form. Solvent extraction is effective then to remove the iron so that cobalt as high purity cobalt carbonate or hydroxide can be recovered directly from the iron solvent extraction raffinate.

We have found that vanadium can be precipitated in good yields from primary leach liquor which has high concentrations of aluminum chloride by oxidizing the vanadium from trivalent and tetravalent states to the pentavalent state under controlled conditions. Sodium chlorate is specially suitable for the oxidant. The resulting precipitate in the form of redcake consisting mainly of $V_2O_5$ may be easily separated from the liquid phase which can be solvent extracted if desired to remove the small residual soluble level of vanadium oxide in the liquid phase.

Another of our discoveries features in the preferred practice of this invention is the separation of nickel and cobalt, if not otherwise removed by solvent extraction, from the aluminum chloride solution as sulfides. It is surprising that in the pH range 1 to 2.5, nickel and cobalt can be effectively precipitated as sulfide by addition of NaHS or $Na_2S$, or $H_2S$ along with equivalent caustic solution, even with operation at atmospheric pressure. Commercial experience has shown that nickel and cobalt sulfides are effectively precipitated in this pH range only at elevated pressures of 3–10 atmospheres, or alternatively at atmospheric pressure only if pH is above about 2.5 and with a high recycle of precipitated sulfides to the precipitation vessel. At pH above about 2.5 in the aluminum chloride system, significant quantities of alumina will coprecipitate with the sulfides. The sulfide precipitation step for removal of nickel and/or cobalt can be practised either before or after vanadium removal. In the former option a small amount of vanadium may coprecipitate with the nickel and cobalt, but advantageously minor levels of arsenic and molybdenum impurities in solution will be removed from solution and prevented from contaminating the vanadium redcake product subsequently precipitated.

Another feature of this invention is the use of calcium or barium salts for selective removal of phosphate from the purified aluminum solution prior to recovery of aluminum as a high grade alumina hydrate. Many of the demetallization catalysts used in oil refining have phosphate as a catalyst constituent and if these are processed by this invention the phosphate will report in the aluminum chloride solution and will not be removed by any of the sulfide or redcake precipitation or solvent extraction steps of this invention. If the alumina recovered from the process is to be used for commercial purpose, such as catalyst support, the phosphate will have to be selectively removed prior to precipitation of alumina otherwise it will coprecipitate with the alumina. This is accomplished by adding excess caustic soda to the aluminum chloride solution contaminated with phosphate to convert to a sodium aluminate phosphate at about pH 11–12. A soluble calcium compound such as calcium chloride, hydroxide or sulfate is added and the phosphate is selectively precipitated. The purified alumina hydrate is then recovered by adding acid to the filtered liquor to hydrolyze and precipitate alumina. A soluble barium compound such as barium chloride or hydroxide could alternatively be used for precipitating the phosphate.

The foregoing inventions and discoveries are employed in various combinations with other steps and procedures in carrying out the processes of this invention which are identified as the "vanadium-nickel selective precipitation process", and "nickel-vanadium selective precipitation process", the "solvent extraction process", the "combination cobalt-vanadium solvent extraction-selective precipitation process" and the "combination vanadium-cobalt selective precipitation-solvent extraction process", As indicated above, the choice of these five alternatives belongs to the operator and affords flexibility in processing a wide range of catalysts.

These five processes, however, share the novel feature of selectively removing the molybdenum and tungsten values from the other metal values in the initial separation steps. Broadly and generally described, then, all five of these present invention processes comprise the steps of contacting the catalyst with hydrochloric acid in a primary leach stage and dissolving substantially all the metal values except those of molybdenum and tungsten. The molybdenum still in the form of sulfide is then separated as insoluble residue from the primary leach solution and ultimately recovered in pure molybdenum compound form while the other metal values in the solution are selectively separated and removed.

The processes hereof also share as a common feature the molybdenum recovery steps. Thus either the residue of the initial leach is roasted and the resulting calcine is leached and the resultant molybdenum leach liquor worked up to recover the molybdenum values, or the leach residue is leached in an alkaline solution at elevated temperature and under pressure of an oxygen-containing gas and the resulting molybdate solution worked up to recover the molybdenum values.

Another common feature of the process of this invention is the retorting of the catalyst under inert atmosphere and prior to leaching with hydrochloric acid in order to minimize difficulties with foaming and metals dissolution during leaching.

The two selective precipitation processes, the solvent extraction process and the two combined selective precipitation-solvent extraction processes of this invention differ from each other mainly in the details of the steps involved in separating the various metal values and particularly in the sequence of those steps and the nature of them as, for example, whether they involve solvent extraction or selective precipitation. In general, however, the corresponding prcipitation and solvent extraction steps are operated in the same range of pregnant solution concentrations, temperatures and pH and use the same quantity of caustic neutralizing agent throughout the process. Prior to aluminum and phosphate separation, the pH is maintained below about 3 to prevent any precipitation of alumina.

The selective precipitation processes of this invention, briefly described, involve in addition to the molybdenum removal and separation step indicated above, first the step of removing the vanadium as redcake followed by precipitation and removal of nickel and cobalt as sulfides, or the reverse sequence. The reagents in the two cases are the same, caustic soda and sodium chlorate being preferred for the purpose of producing redcake while sodium bisulfide is preferred as the sulfur source for converting the nickel and cobalt values in the acid leach solution to sulfides. Iron may be removed before or after redcake precipitation, or may be coprecipitated with the $V_2O_5$ and be contained in the redcake product. In fact, when the ratio of vanadium to iron is 10 to 1 or greater, the iron can be removed completely by the latter procedure. As that ratio decreases, however, the proportion of iron remaining in solution after redcake precipitation increases. In that circumstance the iron may either be removed by solvent extraction techique prior to the redcake precipitation step or, preferably, following that step to serve the double purpose of removing pentavalent vanadium remaining in solution after redcake separation and iron removal.

The solvent extraction process of this invention, briefly described, involves in addition to the molybdenum removal and separation step indicated above, first the step of removing cobalt and iron from the leach solution by solvent extraction, then the step of oxidizing the vanadium of the raffinate of the cobalt and iron solvent extraction step to the tetravalent state, then solvent extracting the vanadium, next treating the raffinate of the vanadium separation step for recovery of the nickel either by ion exchange technique or by sulfide precipitation, The combination cobalt-vanadium solvent extraction-selective-precipitation process involves as the first step the solvent extraction of cobalt and iron from the leach solution following removal of the insoluble leach residue consisting of mainly molybdenum sulfide, as described above. The raffinate of that solvent extraction step then is treated with sodium chlorate and caustic soda to precipitate the vanadium as redcake ($V_2O_5$) which is removed leaving the nickel for recovery from the resulting barren solution by precipitation in sulfide form, as described above.

The combination vanadium-cobalt selective precipitation solvent extraction-process, similarly described in general terms, involves oxidation of vanadium in the leach liquor and precipitation of redcake followed by solvent extraction of cobalt from the liquid phase remaining after redcake removal. The raffinate of the cobalt separation steps is then treated for removal of the nickel values therefrom.

In all five of these processes of this invention aluminum values are recovered last. Further, the procedure involved is the same in each case and may or may not include preliminary steps for removal of phosphorus values. Thus in short form the final stage of each of the five processes includes the step of adding caustic soda to the nickel- and vanadium-free solution emerging from the sequence of metal value recovery steps and thereby converting the aluminum values therein to alumina hydrate and then separating the hydrate product from the resulting aqueous sodium chloride solution.

If phosphorus is to be removed so as to meet alumina product specifications or for other reasons, the final stage of the five processes will include conversion of aluminum values in the nickel- or vanadium free solution to sodium aluminate by addition of caustic soda in requisite proportion. As the next step either calcium chloride or barium chloride is added to the sodium aluminate solution to precipitate substantially all the phosphorus values therein in the form of calcium phosphate or barium phosphate. Following separation and removal of the phosphate precipitate, the liquid phase is acidified with HCl to precipitate the aluminum values as aluminum hydrate which is recovered as a final product.

Those skilled in the art will understand that the redcake recovery method for separating vanadium from solutions of high aluminum chloride content is unique in and of itself and apart from the overall processes of this invention and qualifies as a discovery and invention in its own right. Likewise, the recovery of nickel from solutions of relatively high aluminum chloride content through the use of a source of $H_2S$ is a substantial departure from prior art practice and is an addition of significance to knowledge in the art and also useful apart from the overall processes of this invention.

BRIEF DESCRIPTION OF THE DRAWINGS

Those skilled in the art will gain a further and better understanding of this invention from the detailed description set out below taken in conjunction with the drawings accompanying and forming a part of this specification, in which:

FIG. 7 is a flowsheet of the present invention pressure-oxidizing leach method of recovering molybdenum values from molybdenum sulfide acid leach residue.

DETAILED DESCRIPTION OF THE INVENTION

As illustrated by the flow sheets of the several different processes of this invention set out in FIGS. 1-5, these processes have in common the optional first step of retorting spent catalyst to remove the oil adhering to it and to put the catalyst in condition for leaching readily. Nitrogen, steam or combustion gas of low oxygen content is employed as the retorting atmosphere and for best results we have found that the temperature to which the catalyst is subjected in this operation should be 700° F. to 1200° F. and the operation carried on from one to two hours for effective removal of residual oil. Steam atmosphere is preferable because it generally results in better extraction of alumina.

The de-oiled catalyst is then introduced into 10% to 15% hydrochloric acid, preferably at a temperature near the acid solution boiling point, and is maintained in the solution until substantially all the aluminum, cobalt, vanadium and nickel values have been leached from the catalyst and the acid content is less than about 2 percent. In commercial operation this primary leaching step could be carried out in a single-stage mode or in a counter-current two-stage mode of leaching. The latter would result in more complete extraction of aluminum and more complete HCl utilization. Milling of the de-oiled catalyst prior to the leaching operation is an optional step but is preferred in our practice for all these processes.

With most, if not all, the molybdenum of the catalyst being rejected to the primary leach residue, a solid-liquid separation is made at this stage in each of the processes of this invention. The primary leach residue consisting mostly of molybdenum sulfide is processed in either of two ways (FIG. 6 or FIG. 7) to recover the molybdenum values.

Again in accordance with good practice, the method of recovering the molybdenum values at this stage involves a roasting step carried out at temperatures in the range of 800° F. to 1200° F. to oxidize the sulfur and carbon contents of the leach residue material and to convert to molybdic oxide the molybdenum content thereof.

Figure 6:
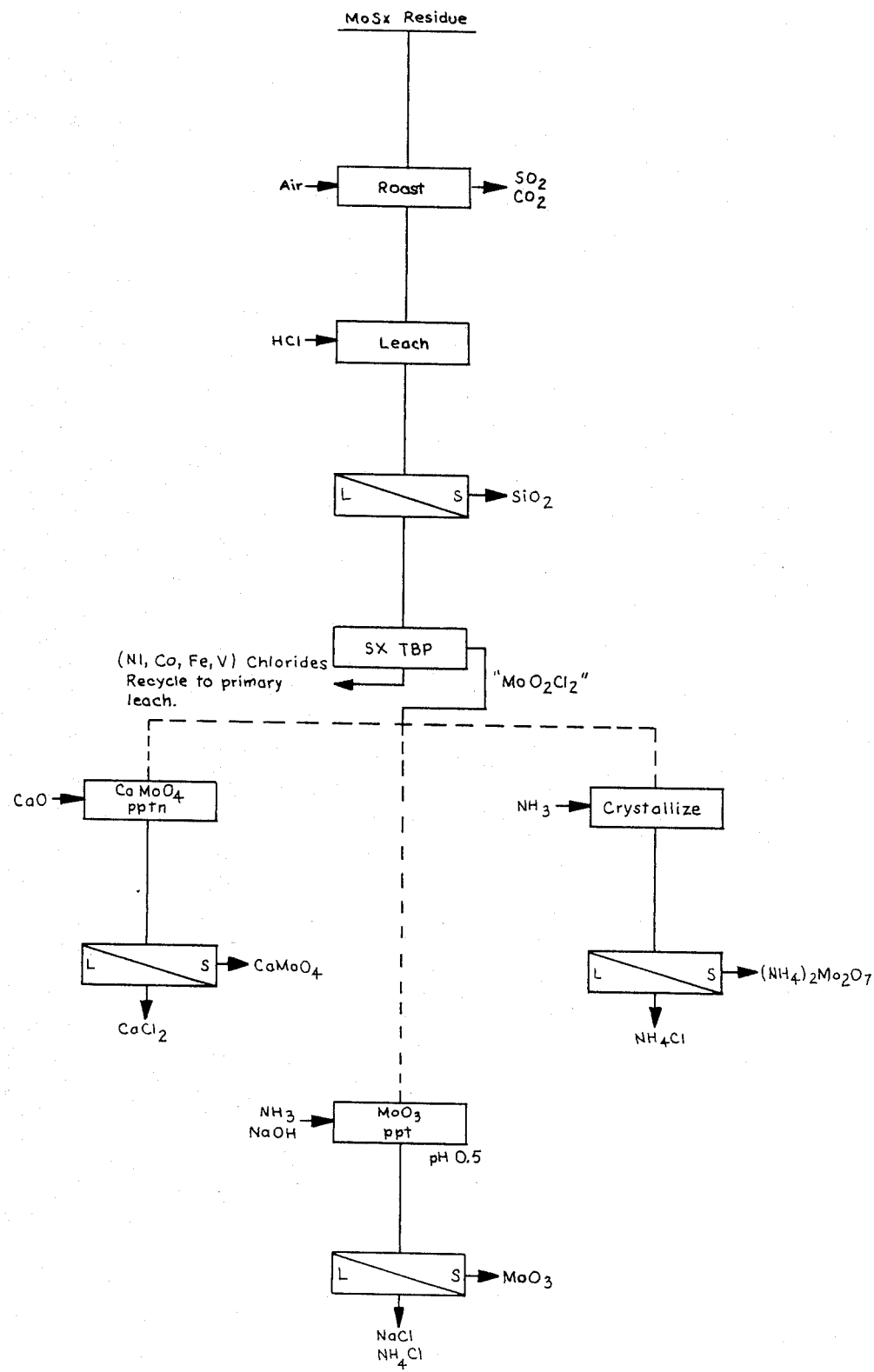
FIG. 6 is a flowsheet of the present invention roast-leach method of recovering molybdenum values from molybdenum sulfide acid leach residue.

The calcined leach residue is then contacted with aqueous HCl in a second leaching operation. The insoluble phase consisting mainly of silica, but possibly containing some tungsten oxide and titanium oxide, is filtered off. The molybdenum containing filtrate, which has a free-acid content of 100-250 grams per liter (gpl) is either subjected to a solvent extraction step as shown in FIG. 6, or is treated with caustic soda to about pH 0.5 to precipitate the molybdenum content as crude molybdenum trioxide. In the solvent extraction step of FIG. 6 a molybdenum chloride solution is produced, which can be converted to molybdic oxide, ammonium molybdate or calcium molybdate by addition of the appropriate reagent.

Instead of roasting the leach residue and recovering the molybdenum values as described immediately above, one may in accordance with this invention subject the primary leach residue to a pressure-oxygen leach and proceed to recover the molybdenum values from the resulting leach solution as in FIG. 7.

Figure 1:
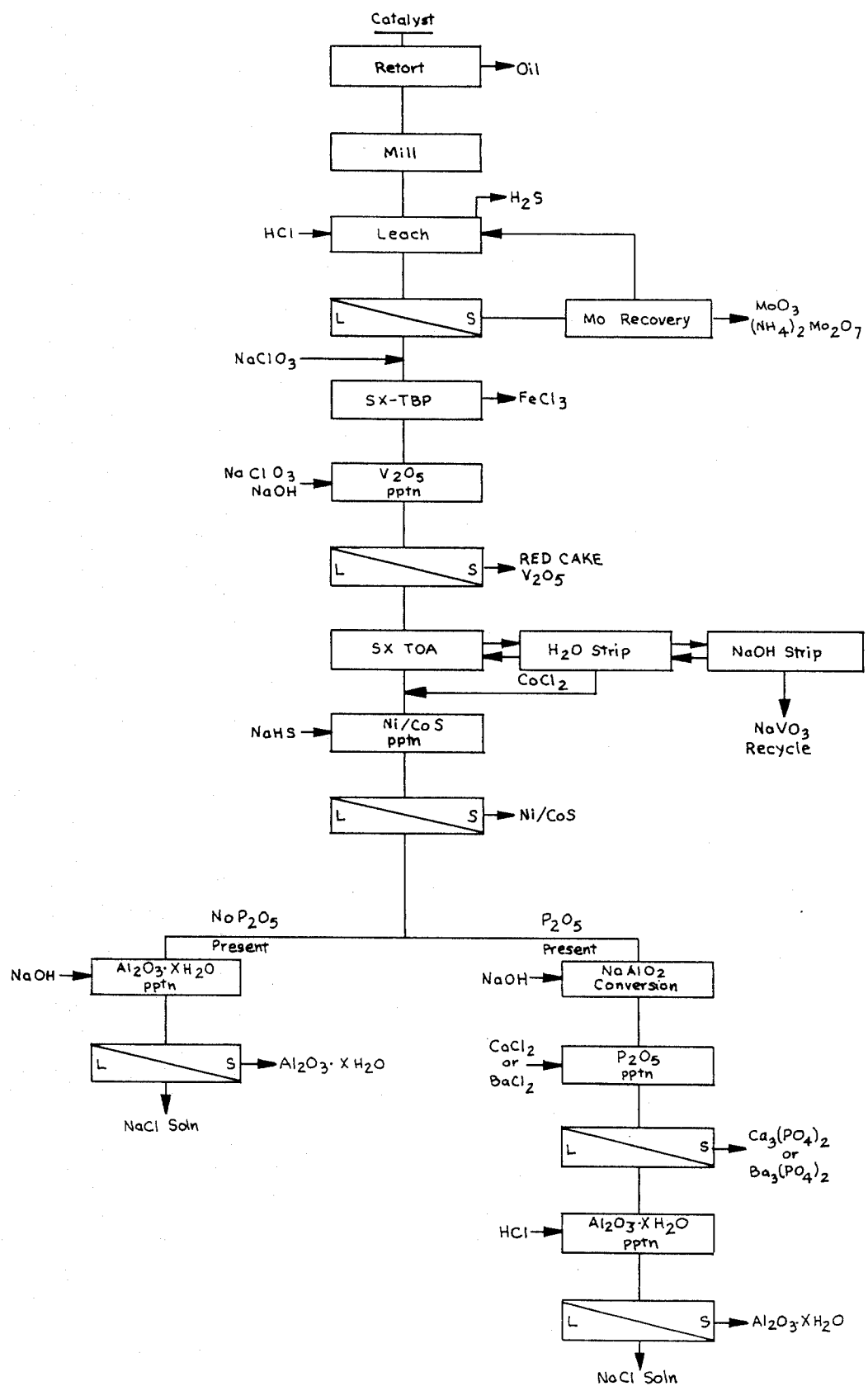
FIG. 1 is a flowsheet diagram of the vanadium-nickel selective precipitation process of this invention showing the sequence of the principal steps of the process and indicating the reactants employed and the products resulting.

Now, in more specific terms our present preferred practice or "best mode" form of each of the several novel processes of this invention described generally above and illustrated in the drawings:

First, the selective precipitation process of FIG. 1 involves retorting spent catalyst under an inert or steam atmosphere to distill off free oil on the catalyst surfaces. Suitable equipment is an indirectly-fired rotary kiln which is swept with steam or inert combustion gas. Alternatively, a multihearth furnace which is fired with combustion gas of low oxygen content would also be suitable. The oil-free product produced from retorting is milled and the milled catalyst is then leached with hydrochloric acid. Configuration may either be single stage or countercurrent and either batch or continuous operation. The acid to retorted catalyst feed ratio will be controlled by minimizing the amount of free acid in the pregnant liquor while maintaining suitably high extractions and reasonable reaction times. The leach slurry is filtered and the leach residue is processed through molybdenum recovery (FIG. 6 or FIG. 7) which also provides recycle of the minor amounts of nickel, cobalt, vanadium and aluminum in the primary leach residue back to primary leaching. The pregnant liquor filtered from the slurry is oxidized to convert all ferrous to ferric iron but an excess of oxidizing agent should not be used since formation of pentavalent vanadium at this point is undesirable. A suitable oxidation potential is 700 millivolts (mv) as read on a platinum/calomel electrode system. The oxidized solution is solvent extracted with tributyl phosphate, 10% tributyl phosphate in Aromatic 150 being a suitable solvent. Iron is extracted as ferric chloride and incidentally also any minor level of molybdenum which has entered the solution through primary leaching. The tributyl phosphate is stripped with water to give a ferric chloride solution including the minor amounts of molybdenum which can be further worked up to give an iron oxide. The raffinate from solvent extraction with tributyl phosphate is then treated with sodium chlorate and caustic solution to increase the emf to 800-1100 mv and control pH between 0 and 2. Initial reaction temperature may be 85°-140° F. but due to the exothermic reaction of oxidizing $V^3$ and $V^4$ to $V^5$, the reaction temperature will increase to 160°-200° F. Vanadium redcake precipitates and should be aged at 160°-200° F. for one hour in order to provide a solid with suitable filtering characteristics and also reduce the amount of coprecipitated alumina. After reaction, the redcake slurry is filtered and the redcake washed. The redcake can then be converted to ferro-vanadium or worked up to other high-purity vanadium compounds. The filtrate from redcake precipitation is solvent extracted with trioctylamine to remove the minor levels of residual vanadium in solution (0.05-0.5 gpl). In the extraction step a small amount of cobalt, if present in solution, will also be extracted. This can be selectively stripped with water and recycled to the raffinate. The organic after selective stripping of cobalt is then stripped with caustic or sodium sulfite to recover all the vanadium from the organic extractant. Sodium vanadate solution is then recycled to primary redcake precipitation. Raffinate from solvent extractant of residual vanadium is then treated with sodium bisulfide or with H₂S/caustic combination in order to precipitate nickel and cobalt sulfides. The precipitation can be carried out at atmospheric pressure or at elevated pressures of 15 to 100 psig H₂S. The desired precipitation temperature is 120°-200° F. in order to give a precipitate with good filtering characteristics.

The pH during sulfide precipitation should be maintained between 1.5 and 2.5 pH. Below pH 1.5, precipitation of nickel and cobalt will tend to be incomplete. Above pH 2.5, coprecipitation of alumina will become significant. Precipitation times of 20-120 minutes are suitable.

The nickel/cobalt sulfides precipitate is filtered from the slurry after reaction and can then be processed by known techniques to recover the individual metals in pure form.

The filtrate from the sulfide precipitation step is now essentially aluminum chloride solution with possible contamination with phosphate if the original spent catalyst contained phosphate as an ingredient in the catalyst formulation. If no phosphate is present, the aluminum chloride solution is neutralized with caustic at pH 6-10 in order to precipitate a hydrated aluminum oxide with high surface area. This material can be used as an ingredient for preparation of catalytically active aluminum oxide.

If phosphate is present in the aluminum chloride solution, it must be removed prior to precipitating the aluminum if it is desired to produce a grade of hydrated aluminum oxide suitable for production of catalyst material. The aluminum chloride solution is converted to sodium aluminate in solution by adding excess caustic and raising the pH to 11-12 and maintaining the slurry temperature in excess of 160° F. Calcium chloride is then added to the aluminate solution in order to selectively precipitate phosphate as calcium phosphate. After aging for a period of time the calcium phosphate is filtered off and discarded. The sodium aluminate solution free of phosphate and dissolved calcium is then treated with hydrochloric acid to reduce the pH to 6-10 and precipitate a hydrated aluminum oxide with high surface area.

The barren liquor after alumina precipitation is a sodium chloride solution with minor amounts of sodium sulfate and may be discarded without the potential environmental hazards of dissolved non-ferrous or heavy metal contamination.

Figure 2:
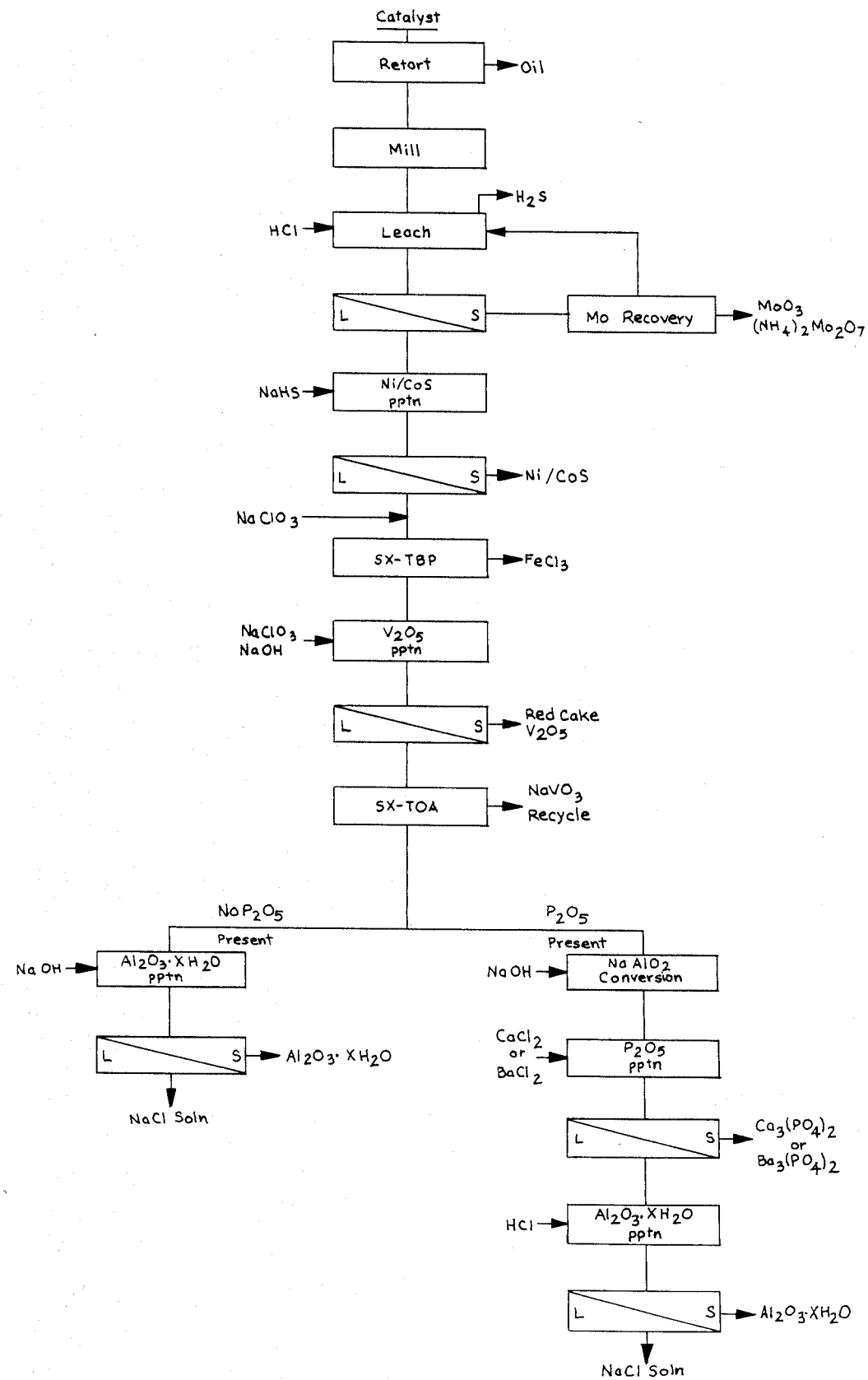
FIG. 2 is a flowsheet diagram like that of FIG. 1 similarly illustrating the nickel-vanadium selective precipitation process of this invention.

The procedural steps of the process of FIG. 2 are the same as those of FIG. 1 except that the order of nickel/cobalt sulfide and $V_2O_5$ precipitation is reversed with sulfide precipitation being placed before both iron removal and $V_2O_5$ precipitation. This provides the advantage of reducing some contamination in the vanadium redcake with arsenic or molybdenum since these are now completely removed by the sulfiding of nickel and cobalt. The disadvantage is that in the further processing of the nickel and cobalt sulfides arsenic and molybdenum will have to be removed. The nickel and cobalt sulfide precipitate will also contain several percent of vanadium.

If the level of iron in the vanadium pentoxide redcake precipitate is not of significance, then the solvent extraction with tributyl phosphate step can be eliminated and the iron in the pregnant liquor can be allowed to coprecipitate with the redcake. Any residual iron will be removed by the solvent extraction scavenge step after redcake precipitation.

In the process of FIG. 2, the spent catalyst is retorted and leached and the primary leach residue sent to molybdenum recovery in a similar fashion to that of FIG. 1. The pregnant liquor from primary leaching is sent to sulfide precipitation. This is also carried out in a similar fashion to that in FIG. 1 for the corresponding step of the process.

Use of pressure sulfiding is less desirable in this case, however, since a higher amount of vanadium will coprecipitate with the nickel and cobalt sulfides, eg. 10-15% of the vanadium.

The nickel/cobalt sulfide precipitate after filtering can be worked up by methods known to those skilled in the art to recover the pure nickel and cobalt forms. Additional steps of vanadium removal will have to be incorporated in these known processes.

The barren liquor from sulfide precipitation is then oxidized to emf 700 mv to increase all iron to the ferric state and the solution is then solvent extracted with 10% tributyl phosphate to extract ferric chloride from the pregnant liquor. Raffinate from this solvent extraction step is then subjected to oxidation with sodium chlorate and addition of caustic to control pH between 0-2 to precipitate vanadium redcake. The redcake is filtered off and recovered as product. The barren liquor from redcake precipitation is solvent extracted with a trioctylamine solution to recover the residual levels of pentavalent vanadium in the solution. Raffinate from this solvent extraction step is now processed similar to the corresponding steps of the FIG. 1 process, that is either hydrated aluminum oxide is produced directly by addition of HCl to the raffinate or phosphorus is first removed as calcium phosphate.

Figure 3:
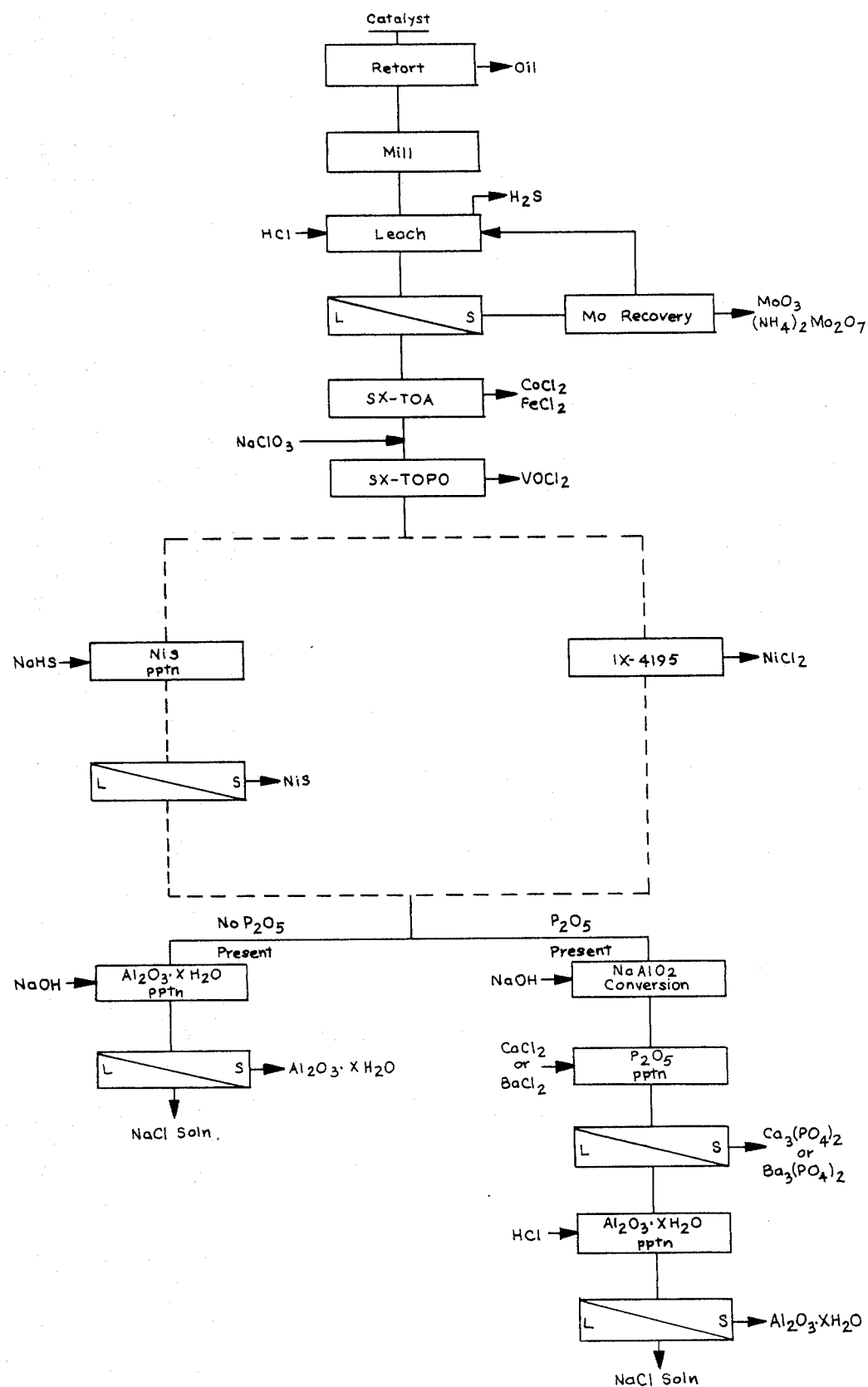
FIG. 3 is another such diagram likewise showing the essential features of the solvent extraction process of this invention.

In carrying out the solvent extraction process of FIG. 3 spent catalyst is retorted and leached and the primary molybdenum sulfide leach residue sent to molybdenum recovery in a similar manner to that of the FIG. 1 process. The pregnant liquid derived from primary leaching is subjected to solvent extraction to extract cobalt and also iron as ferrous chloride. The organic is stripped with water to provide a cobalt/ferrous solution which can be worked up by known methods to recover pure cobalt materials and iron oxide precipitate for discard. The barren liquor from solvent extraction is then oxidized with sodium chlorate to emf 700 mv to oxidize $V^3$ up to $V^4$. Formation of pentavalent vanadium is undesirable, so an excess of oxidizer should not be used. The oxidized solution is solvent extracted with a 10% solution of trioctylphosphine oxide (TOPO) in aromatic diluent. Vanadium is extracted as the oxychloride. The organic solution is stripped with slightly acid water to produce a vanadium chloride solution from which high purity vanadium materials can be recovered by means known to those skilled in the art.

Raffinate from the solvent extraction with TOPO is then treated to recover nickel. As one alternative, the aluminum chloride-nickel chloride solution is treated with sodium bisulfide or $H_2S$ caustic equivalent to selectively precipitate nickel sulfide as in the FIG. 1 process. Alternatively, the aluminum chloride-nickel chloride solution can be passed through an ion exchange column filled with the selective chelating ion exchange resin IX4195 [of Dow Chemical Co.]. This resin selectively absorbs nickel from the solution and the nickel can be recovered from the ion exchange column by stripping the column with 2N hydrochloric acid and the nickel recovered from the nickel chloride solution by previously known methods.

The aluminum chloride solution produced after nickel recovery is then processed to recover an aluminum oxide hydrate with high surface areas by either of the two methods described above in reference to the flow sheet of FIG. 1.

Figure 4:
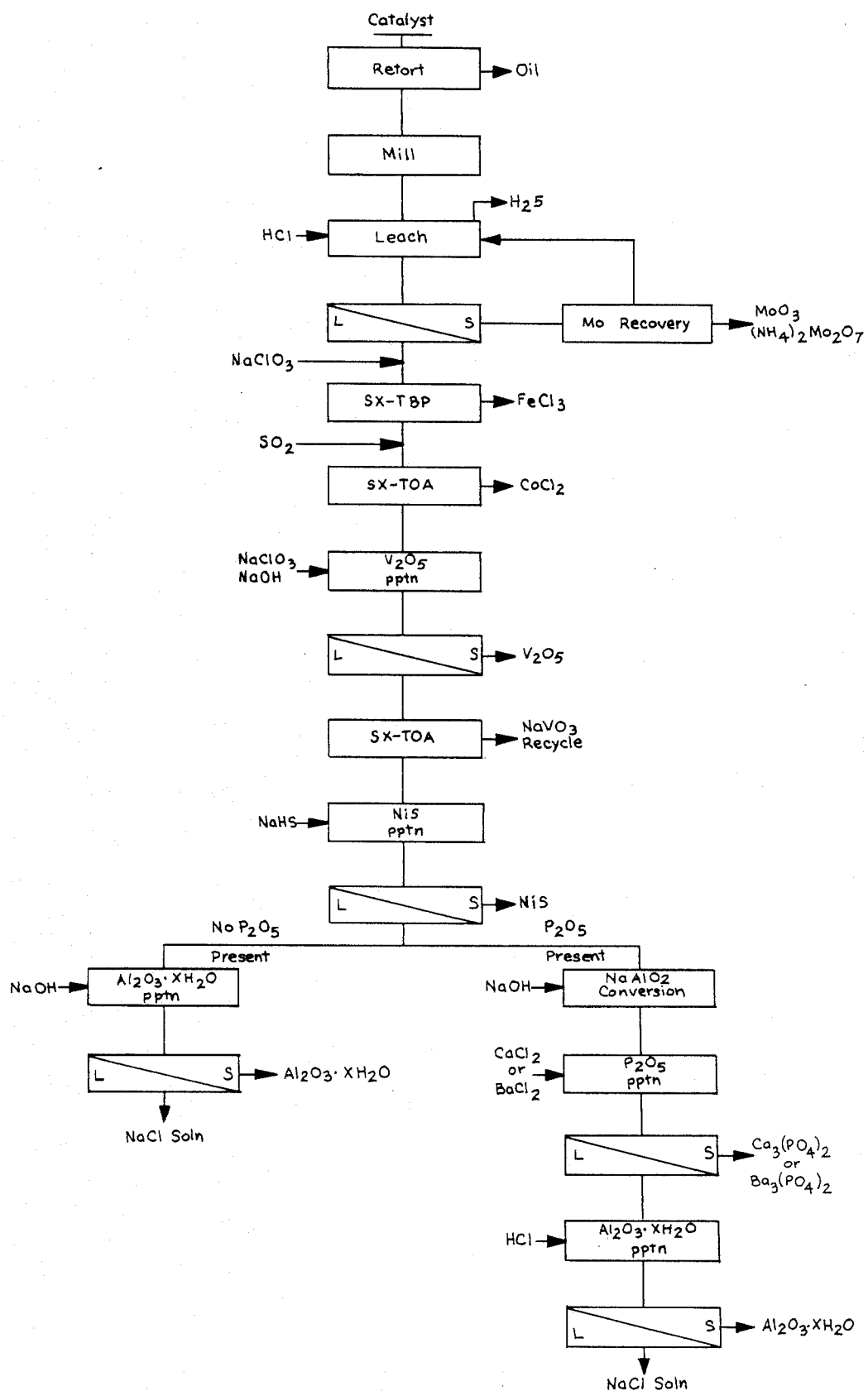
FIG. 4 shows in similar manner the combination cobalt-vanadium solvent extraction-selective precipitation process of this invention.

In carrying out the combination process of FIG. 4 the spent catalyst is retorted, leached with hydrochloric acid and the molybdenum sulfide residue and pregnant liquor treated in a fashion similar to that of the FIG. 1 process. Iron is removed from the pregnant liquor by solvent extraction with tributyl phosphate in a similar fashion to that in FIG. 1. Raffinate liquor from the tributyl phosphate solvent extractant is then treated with $SO_2$ to reduce to tetravalent state any pentavalent vanadium formed during the iron oxidation prior to the solvent extractionstep. The reduced liquor is then solvent extracted with trioctylamine to remove cobalt chloride which is stripped from the organic with water and the cobalt is then recovered in pure form. The raffinate from solvent extraction is oxidized with sodium chlorate and the pH controlled between 0-2 with caustic in order to precipitate vanadium pentoxide redcake. Conditions for the precipitation are similar to those of the FIG. 1 process. Barren liquor from redcake precipitation is solvent extracted with trioctylamine to extract residual soluble vanadium in the liquor. The vanadium is stripped from the organic with caustic and recycled to the precipitation step. Barren liquor from vanadium removal is then treated with sodium bisulfide or $H_2S$/caustic equivalent to precipitate nickel sulfide. This may be operated at atmospheric or elevated pressure and at 120°-200° F. similar to sulfide precipitation of FIG. 1. The nickel sulfide is filtered off and worked up to recover pure nickel forms by procedures known to those skilled in the art. The aluminum chloride liquor free of all heavy metals is then worked up in either of the alternate methods described in reference to FIG. 1 to recover aluminum oxide hydrate with high surface area and free of any phosphate contamination.

Figure 5:
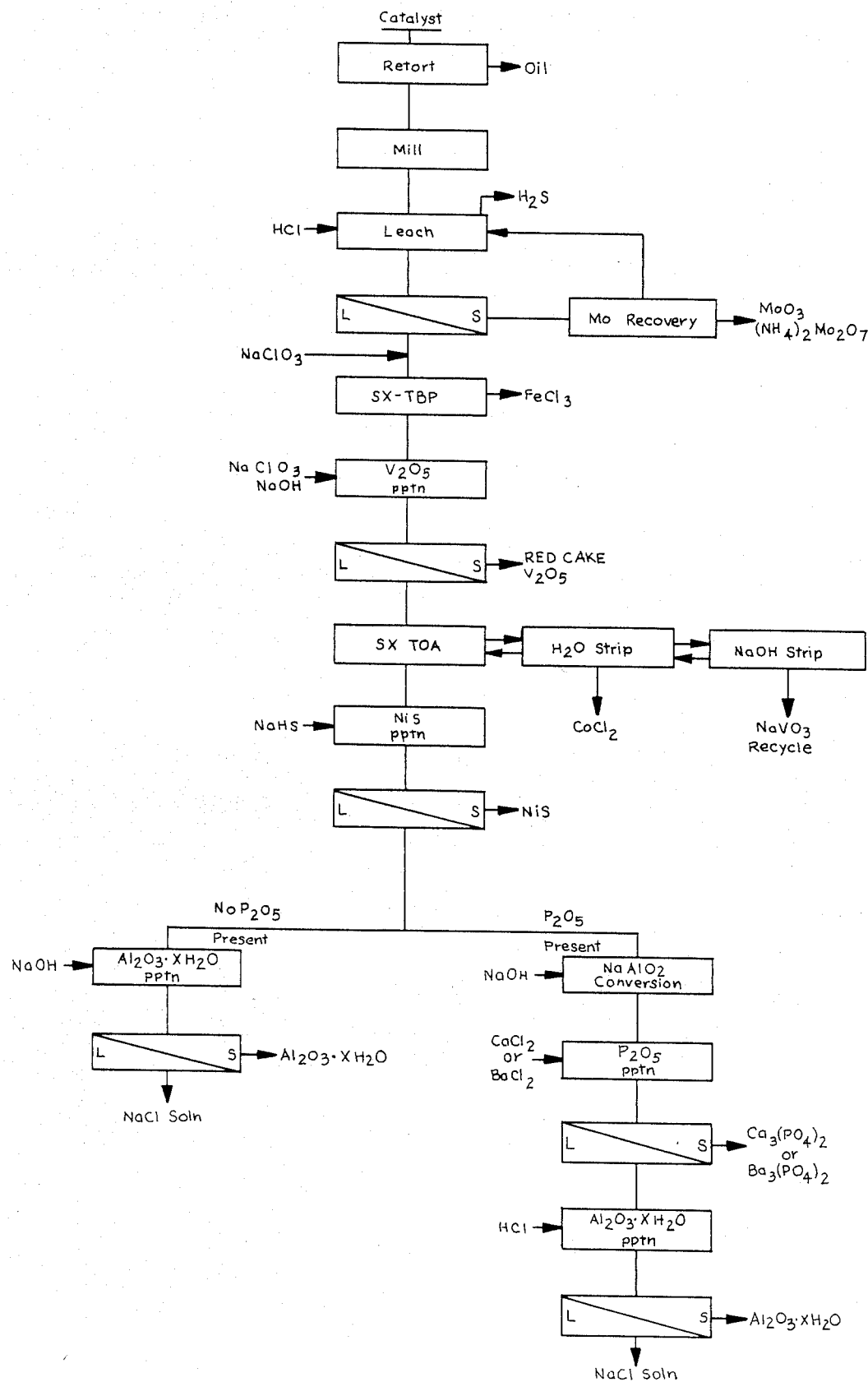
FIG. 5 is also a flowsheet diagram which illustrates the combination vanadium-cobalt-selective precipitation solvent extraction process of this invention.

The combination method of FIG. 5 likewise involves retorting spent catalyst to remove oil, then milling and acid leaching and separating and removing and the primary molybdenum sulfide leach residue for molybdenum recovery. After oxidizing the iron as previously indicated, the pregnant liquor is solvent extracted with tributyl phosphate to remove ferric chloride and is then treated with sodium chlorate and caustic to precipitate vanadium pentoxide redcake. These steps are all similar to those of the FIG. 1 process. The barren liquor from redcake precipitation containing minor levels of residual vanadium is solvent extracted with trioctylamine to remove cobalt and the residual vanadium in the liquor. The organic is selectively stripped with water to recover a cobalt chloride stream which can be worked up to recover pure cobalt material by techniques known to those skilled in the art. The organic, after selective water stripping, is stripped with caustic to recover the vanadium as sodium vanadate solution which is recycled to vanadium precipitation. Raffinate from this solvent extraction is sent to sulfide precipitation where sodium bisulfide or $H_2S$/caustic in equivalent amounts are added to precipitate nickel sulfide. This can be operated at either atmospheric or elevated pressures and at temperatures of 120°-200° F. The nickel sulfide is filtered off and is worked up by known techniques to recover nickel in pure form. The aluminum chloride liquor free of all heavy metals is then processed in the fashion similar to that described in reference to FIG. 1 to recover aluminum oxide hydrate with high surface area and free of phosphate contamination.

As shown in FIG. 6, molybdenum values of spent catalysts are recovered in accordance with this invention by roasting molybdenum sulfide primary leach residue in a multihearth roaster with air to convert the sulfide to a molybdenum oxide calcine and evolve the sulfur and carbon constituents as their oxides. Other types of roast equipment which are used for roasting of coventional molybdenum sulfide concentrates would be equally suitable. Roast temperature should be controlled between 800°-1200° F. by use of diluent air or external cooling in order to avoid volatilization of molybdic oxide and loss of molybdenum in the flue gas. The calcine is cooled and leached in concentrated hydrochloric acid which dissolves the molybdenum along with the residual nickel, cobalt, vanadium, and aluminum values. Leaching is carried out in simple batch or cascaded leach vessels and requires 2-4 for dissolution of the molybdenum. Leach temperature is in the range 160°-215° F. The leach oxide calcine is filtered to remove silica and other refractory materials which have not dissolved. The pregnant liquor is solvent extracted with 10% tributyl phosphate in aromatic diluent to selectively extract molybdenum as the oxychloride. The raffinate which carries the residual nickel, cobalt, vanadium and aluminum values is recycled to primary leaching of catalyst. The organic phase rich in molybdenum is stripped with water to recover a concentrated molybdenum oxychloride solution. Molybdenum can be recovered from this solution by various techniques known to those skilled in the art. For example, treatment with calcium oxide or other soluble calcium salts to selectively precipitate calcium molybdate which is filtered off. Alternatively, the solution can be treated with ammonia and the ammonium chloride solution evaporated to crystallize ammonium dimolybdate. Alternatively, the solution can be treated with ammonia or caustic at pH of 0.5 to precipitate molybdic oxide, which is filtered off for recovery.

Alternatively, as shown in FIG. 7 the molybdenum values may according to this invention be recovered by subjecting the molybdenum sulfide primary leach residue to a pressure-oxidizing leach in sodium carbonate or caustic solution which selectively dissolves the molybdenum and a portion of the vanadium values in the leach residue. Thus, molybdenum sulfide residue is slurried in a sodium carbonate or caustic solution at about 20% solids concentration. This slurry is then leached in a pressure autoclave at 250°-450° F. and under oxygen partial pressure of at least 20 psig. Vigorous agitation is maintained during the leach period which will normally require about 2-5 hours. The pressure-leach slurry is filtered and the solids which contain the nickel, cobalt and iron values of the original molybdenum sulfide residue are then leached with hydrochloric acid to dissolve these nickel, cobalt and iron values and leave a residue of silica and coke, which is discarded. The nickel-, cobalt-, iron- chloride solution is recycled to primary leach. The pregnant liquor produced in pressure leaching is then treated with hydrochloric acid to give a pH of 7-9 and selectively precipitate the minor levels of aluminum contain in the molybdenum-rich liquor. The molybdenum-rich liquor can then be treated by various know techniques to recover the molybdenum in pure form, for example, treatment with calcium chloride solution at pH 6 to selectively precipitate calcium molybdate. Alternatively the solution can be treated by solvent extraction with commercially-available Aliaquat 336 (a product of Henkel Co.) at pH 12.8 to selectively extract the molybdenum which is then recovered as ammonium dimolybdate from the organic strip. Alternatively, the solution can be acidified and reduce with $SO_2$ at pH 3 and the molybdenum recovered by selective solvent extraction with trioctylamine. The ammonium molybdate is then recovered from the strip liquor of the organic.

Those skilled in the art will gain a further and better understanding of this invention in its various forms and aspects from the following illustrative, but not limiting, examples of the procedure of this invention.

EXAMPLE I

Samples of three spent catalysts were leached in hydrochloric acid and the extraction of each of the major constituents determined. One portion of each catalyst was leached in the as received state while another portion was retorted at 750° F. under a steam atmosphere to drive off the free oil on the catalyst. For the leach test, 25 grams of material was refluxed with 250 ml of 31% HCl for 8 hours. On completion of leaching, the leachate was filtered and the residue and liquor analyzed and the extractions determined with the results shown in Table 1.

TABLE 1

| Spent Catalyst | Ni | Co | Mo | V | Al | Fe | $C_{Total}$ | Free Oil |
|---|---|---|---|---|---|---|---|---|
| X - 621 Head Analysis % | 4.5 | 1.2 | 3.6 | 13.4 | 15.2 | .6 | 19.2 | 14 |
| % Extraction | | | | | | | | |
| As Received | 72 | 58 | 12 | 75 | 85 | 81 | | |
| After Retorting | 90 | 68 | ~1 | 96 | 94 | 91 | | |
| X - Head Analysis % | 5.1 | .04 | 3.6 | 10.4 | 19.0 | .7 | 18.6 | 9.6 |
| % Extraction | | | | | | | | |
| As Received | 73 | — | 17 | 71 | 90 | 80 | | |
| After Retorting | 84 | — | ~1 | 77 | 90 | 84 | | |
| GC 106 Head Analysis % | 5.2 | .5 | 3.5 | 12.1 | 19.1 | .7 | 17.4 | 11.5 |
| % Extraction | 69 | 60 | 15 | 96 | 96 | 88 | | |
| After Retorting | 98 | 83 | 12 | 99 | 96 | 93 | | |

The extraction of vanadium, aluminum, nickel and cobalt was selective relative to that of molybdenum in the as-received catalyst. After retorting, the selectivity was improved and the extraction is such that the extractions of each of the metals except molybdenum was greater than 70% with aluminum being 90–96% while extraction of molybdenum was less than 12%.

EXAMPLE II

Samples of spent catalyst were retorted in the laboratory tubular furnace at 650°–1000° F. and under nitrogen or steam atmospheres. The retorted catalyst samples were then leached by a leach test similar to that in Example I. The nature of foaming during leaching was observed and the extractions of vanadium and aluminum determined. The results are given in Table 2.

TABLE 2

| Spent Catalyst | Retorting °F. | Atmos | Foaming in Leach | % Extraction V | AL |
|---|---|---|---|---|---|
| X 621 | 650 | $N_2$ | Yes | 95 | 92 |
| | 750 | $N_2$ | Yes | 96 | 94 |
| | | Steam | No | 96 | 93 |
| | 930 | $N_2$ | No | 95 | 92 |
| | | Steam | No | 96 | 93 |
| X - 1 | 650 | $N_2$ | Yes | 75 | 90 |
| | 750 | $N_2$ | Yes | 70 | 89 |
| | | Steam | No | 75 | 91 |
| | 930 | $N_2$ | No | 68 | 89 |
| | | Steam | No | 73 | 89 |

The extractions of vanadium and aluminum were relatively independent of the retorting temperature between 650° and 930° F. However, in order to eliminate foaming during leaching the retort temperature should be maintained at 750° F. for about 60 minutes or at higher temperature for shorter times. The specific retorting temperature and time will, of course, be highly dependant on the residual oil left on the catalyst when it is dumped from the catalyst bed at the refinery.

EXAMPLE III

A pilot campaign on retorting and leaching was carried out on four of the catalysts. The raw spent catalysts were retorted in a 1.5 ft diameter by 15 ft long rotary retort which was indirectly heated with fuel gas and the interior of the kiln swept with steam or cooled combustion gas with low free oxygen content. The nominal feed of raw spent catalyst to the kiln was 50 to 200 lbs. per hour with retention times of 0.5–2 hours and sweep gas flow velocities of 0.4–3.4 feet per second and retort temperatures of 800°–1100° F. The total operating time on the four catalysts was 40 days. The average analysis of the retorted catalyst and the percent carbon and sulfur volatilized is given in Table 3. The percent of total carbon volatilized is a function essentially of the residual free oil on the spent catalyst when it is received. The volatilization of sulfur was less than 20% and suggests that most sulfur is bound with a metallic constituent in the spent catalyst.

TABLE 3

| | % Analysis After Retorting | | | | | | | | % Volatilized | |
|---|---|---|---|---|---|---|---|---|---|---|
| Catalyst | Ni | Co | Mo | V | Al | Fe | C | S | C | S |
| X621 | 5.0 | 1.3 | 4.0 | 14.9 | 16.9 | .7 | 10.2 | 17 | 54 | 13 |
| X621* | 5.0 | 1.3 | 4.5 | 14.5 | 16.9 | .6 | 10.7 | 19.6 | 50 | ~10 |
| X - 1 | 5.5 | .04 | 3.9 | 11.2 | 20.5 | .8 | 12.0 | 13 | 42 | 16 |
| A - 1 | .2 | 1.85 | 5.6 | .3 | 28.5 | 1.0 | 8.5 | 4.7 | 70 | 15 |
| GC 106 | 5.6 | .5 | 3.8 | 13.0 | 20.5 | .8 | 11.4 | 6.0 | 39 | 9 |

*Retorted under combustion gas

The retorted catalysts were separately milled in a 1' by 3' ball mill to approximately 70% minus 200 mesh.

Each milled, retorted catalyst was then leached in a continuous single stage pilot plant leach circuit which comprised five cascaded leach vessels, ten liters each, which were fed continuously with 31% hydrochloric acid, wet retorted catalyst cake and water. The off gas from the leach vessels was scrubbed and monitored to determine HCl and $H_2S$ losses. Overflow slurry from the final leach vessel was accumulated and then filtered and the pregnant liquor and leach residues analyzed. The nominal feed rates of retorted catalyst and 31% HCl were 2 pounds and 0.8 gallon per hour, respectively.

The ratio of feed acid to retorted catalyst was adjusted such that the final acid in the fifth leach vessel was approximately 10 gpl. The average values found in the pilot plant campaign were 1.1, 1.1, 1.35, 1.25 pounds HCl (100%) per pound catalyst for the catalysts X-621, -x1, A-1 and GC-106, respectively. This includes loss of about 5% HCl by volatilization from the leach vessels. The acid consumption corresponds to the stoichiometric values within 5% accuracy. The leach temperature was maintained at 210°–230° F. and retention time through the leach circuit was 13–16 hours. The total leach campaign was 25 days with approximately 6 days on each of the four catalysts investigated. The results are summarized in Table 4.

TABLE 4

| | Analysis %, gpl/Extraction % | | | | | | | | | |
|---|---|---|---|---|---|---|---|---|---|---|
| | Ni | Co | Mo | V | Al | Fe | C | S | Cl | HCL |
| Pregnant Liquor | | | | | | | | | | |
| X 621 | 10.9 | 2.3 | .02 | 34.9 | 47.0 | 1.6 | | | 278 | 7 |
| X - 1 | 9.8 | .07 | .14 | 21.7 | 54.5 | 1.8 | | | 267 | 8 |
| A - 1 | .4 | 3.4 | 1.2 | .7 | 65.0 | 2.0 | | | 267 | 8 |
| GC 106 | 9.6 | .6 | .05 | 28.1 | 48.9 | 1.1 | | | 277 | 10 |
| Primary Leach Residue | | | | | | | | | | |
| X 621 | 4.6 | 2.0 | 12.9 | 5.1 | 3.8 | .6 | 30 | 24 | | |
| X - 1 | 5.1 | .1 | 9.4 | 6.7 | 4.8 | .4 | 33 | 24 | | |
| A - 1 | .1 | 1.7 | 15.2 | .1 | 2.6 | .5 | 24 | 15 | | |
| GC 106 | 4.6 | .9 | 12.6 | 1.1 | 2.9 | .3 | 34 | 20 | | |
| Leach Extraction | | | | | | | | | | |
| X 621 | 77 | 56 | 0 | 86 | 94 | 79 | 0 | 45* | | |
| X - 1 | 61 | ~50 | 1 | 73 | 91 | 79 | 0 | 18* | | |
| A - 1 | 79 | 73 | 9 | 83 | 97 | 82 | 0 | <5* | | |
| GC 106 | 80 | 49 | 0 | 98 | 95 | 77 | 0 | <5* | | |

*Loss as H₂S to off-gas from leach

This example demonstrates how better than 90% of the aluminum and most of the nickel, cobalt and vanadium can be selectively leached away from the molybdenum with less than 10% of the molybdenum being leached. The higher leach value of molybdenum for the A-1 catalyst, (9%) is probably a reflection of the less than stoichiometric ratio of sulfur to total Ni+Co+Mo+V in the spent A-1 catalyst such that the molybenum is existing partly as an oxide form in the spent catalyst.

The minimum level of HCl in solution was about 10 grams per liter in order to provide aluminum extractions of 91–97%

EXAMPLE IV

Retorted catalyst from Example III which had been retorted under neutral combustion gas was subjected to a counter-current two-stage batch leach in two 30-liter vessels. Fresh catalyst was fed to the first stage leach vessel and leached with partial pregnant liquor from the second stage leach for 8 hours. The slurry was then separated by decantation and the wet solids were subjected to a second stage leach with added 31% HCl. After a second stage leach of 4–8 hours, the slurry was filtered; the filtrate was directed to the first stage leach and the leach residue constituted molybdenum sulfide residue from the primary leach. The liquor decanted from the first stage leach constituted the pregnant liquor. Leach temperatures were maintained at 220° F. in the first stage leach and at 170° initial and 220° F. final in the second stage leach. The results are summarized in Table 5.

TABLE 5

| | Analysis %, gpl/Extraction % | | | | | | | | |
|---|---|---|---|---|---|---|---|---|---|
| | Ni | Co | Mo | V | Al | Fe | C | S | HCL |
| Pregnant Liquor | | | | | | | | | |
| 1st Stage* | 10.7 | 2.1 | .03 | 39.0 | 52.1 | 1.5 | | | 1 |
| 2nd Stage | 8.7 | 1.8 | .05 | 25 | 24 | .4 | | | 137 |
| Leach Residue | | | | | | | | | |
| 1st Stage* | 4.8 | 1.5 | 5.9 | 10.3 | 9.1 | .2 | 16 | 19 | |
| 2nd Stage | 3.3 | 1.5 | 12.7 | 2.3 | 1.8 | .2 | 32 | 19 | |
| Residue Extractions | | | | | | | | | |
| 1st Stage* | 42 | 30 | .2 | 57 | 67 | 80 | | | |
| 2nd Stage | 86 | 71 | .5 | 97 | 97 | 92 | | | |

*1st stage pregnant liquor = product liquor
2nd stage residue = fine leached residue This experiment illustrates that counter-current, two-stage leaching will give slightly better extractions of Ni, Co, V and Al and residual hydrochloric acid in the pregnant liquor.

EXAMPLE V

Pregnant leach liquor produced in a similar leach to that of Example of IV was subjected to sulfiding with sodium bisulfide and after removal of the sulfide precipitate, was chlorinated to precipitate $V_2O_5$. The barren liquor was then solvent extracted to remove residual soluble vanadium.

To 0.5 liter of pregnant liquor, 320 ml of 20% caustic solution, which had previously been saturated with $H_2S$, was added; nickel and cobalt sulfides precipitated immediately. The slurry was maintained at 125° F. and under atmospheric pressure for one hour and then filtered. The residue was analyzed and the filtrate was chlorinated by bubbling $Cl_2$ for 45 minutes at 125°–160° F. A redish-brown precipitate was produced and was filtered off and analyzed. The filtrate, which was a light yellow color, was solvent extracted with a 10% triisoctylamine (Alamine 330) solution in aromatic diluent at a ratio of 1 organic to 1 aqueous to extract residual $V^5$ and produce a colorless raffinate. The analytical results are summarized in Table 6.

TABLE 6

| | Analysis % or gpl | | | | | |
|---|---|---|---|---|---|---|
| | Ni | Co | Mo | V | Al | Fe |
| Liquor | | | | | | |
| Feed | 12.9 | 2.8 | .07 | 45.4 | 52.5 | 1.5 |
| After Ni/CoS | .014 | .006 | .02 | 19.1 | 23.0 | .5 |
| After V$_2$O$_5$ | .016 | .005 | .007 | .6 | 19.2 | .1 |
| After SX | .016 | .004 | .004 | .03 | 19 | .001 |
| Solids | | | | | | |
| Ni/CoS | 26.4 | 6.0 | .04 | .4 | .2 | .4 |
| V$_2$O$_5$ | .1 | .004 | .04 | 44.5 | 1.6 | 1.5 |

Sulfiding the pregnant liquor with NaHS at atmospheric pressure reduces the nickel and cobalt to 0.01 and 0.006 gpl, respectively. Chlorination of the barren liquor precipitated the vanadium from 19.1 gpl down to 0.6 gpl. Subsequent solvent extraction with TiOA removes the vanadium down to a residual level of 0.03 gpl. The resultant purified aluminum chloride liquor can be worked up by known methods to produce various pure grades of aluminum oxide hydrate.

A highgrade nickel cobalt sulfide intermediate product and a vanadium pentoxide redcake have also been produced.

EXAMPLE VI

This example demonstrates the precipitation of vanadium as redcake directly from fresh pregnant liquor and the subsequent precipitation of nickel sulfide and cobalt sulfide by addition of a sulfur source at atmospheric pressure.

A 0.5 liter specimen of pregnant liquor from Example IV was heated to 125° F. and then sodium chlorate (16 grams) and 20% caustic (280 ml) were added intermittently over one hour. Vanadium pentoxide redcake precipitated and the temperature of the slurry increased by heat of reaction to 185° F. The pH was 2.0 and the EMF 950 mv. The slurry was maintained for an additional 1 hour at 185° F. during which time the precipitate turned from a light brown to a deep red brick color. The slurry was filtered and the precipitate and barren liquor analyzed. To the barren liquor, caustic solution saturated with H$_2$S was added to precipitate nickel and cobalt sulfides under atmospheric pressure. The sodium bi-sulfide solution was added until no further precipitation of nickel and cobalt was apparent. The slurry was then filtered and the barren liquor and precipitate analyzed with the results given in Table 7.

TABLE 7

| | Analysis % or gpl | | | | | |
|---|---|---|---|---|---|---|
| | Ni | Co | Mo | V | Al | Fe |
| Liquor | | | | | | |
| Head | 11.8 | 2.3 | .05 | 44.0 | 52.2 | 1.6 |
| After V$_2$O$_5$ | 6.3 | 1.2 | .009 | .13 | 26.5 | .02 |
| After Ni/CoS | .04 | .002 | .004 | .04 | 26 | .005 |
| Solids | | | | | | |
| V$_2$O$_5$ | .04 | .01 | .03 | 49.8 | 1.7 | 2.0 |

Precipitation of vanadium redcake from the pregnant liquor has given a barren liquor analyzing 0.13 grams per liter vanadium. Sulfiding of this liquor with sodium bisulfide reduces the nickel and cobalt to 0.04 and 0.002 gpl, respectively. The vanadium redcake has very low levels of Ni and Co. [0.04% and 0.01%] and relatively low level of Al (1.7%).

EXAMPLE VII

This example demonstrates the selective solvent extraction of cobalt and iron with TIOA from pregnant liquor followed by precipitation of vanadium as redcake by addition of sodium chlorate, and finally the extraction of residual vanadium from the barren liquor by solvent extraction with TIOA.

The selective solvent extraction of cobalt and ferrous iron was carried out in a continuous mixer-settler pilot plant unit using pregnant liquor produced from primary leaching of Example IV. The mixer boxes were of 0.6 liter volume, the settler compartments each had a an area of 90 cm$^2$ and the impeller diameter was 5 cm. Four stages of extraction and three of stripping were employed and the solvent was 5% trioctylamine in Exxon AR 150 aromatic solvent. The nominal liquid feed rates were 48 mls per minute aqueous feed, 120 mls per minute loaded organic and 10 mls per minute barren strip. The loaded organic was stripped with water. Solvent extraction was carried out at approximately 80° F. Six campaigns of approximately six hours duration were carried out.

A 0.5 liter sample of raffinate from the cobalt iron solvent extraction step was diluted to one liter and then 330 ml of 20% NaOH and 18 grams of sodium chlorate were added in aliquots over one hour and the solution was held at 175° F. Vanadium pentoxide redcake precipitated and the slurry was held for an additional hour at 175° F. and then the slurry was filtered. The final pH and EMF were 1.8 and 800 mv, respectively. The precipitate was repulped and washed twice with 0.1N HCl. The barren vanadium liquor was solvent extracted with 5% TiOA in a laboratory shakeout test at a ratio of 1:1 to extract the residual vanadium in the barren liquor. The analytical results are summarized in Table 8.

TABLE 8

| | Analysis % or gpl | | | | | |
|---|---|---|---|---|---|---|
| | Ni | Co | Mo | V | Al | Fe |
| Liquor | | | | | | |
| Head | 12.8 | 2.5 | .03 | 43.0 | 53.8 | 1.4 |
| Co/Fe Raffinate | 13.6 | .005 | .03 | 44.7 | 53.8 | .001 |
| Co/Fe Strip | .07 | 11.9 | .01 | .3 | .2 | 4.6 |
| After V$_2$O$_5$ ppt | 5.4 | .002 | .01 | .18 | 23.6 | .001 |
| V$_2$O$_5$ Raffinate | 5.3 | .002 | .01 | .012 | 23.0 | .001 |
| Solids | | | | | | |
| V$_2$O$_5$ | .05 | .002 | .02 | 53.8 | 1.9 | .01 |

Selective solvent extraction of cobalt and iron from the pregnant liquor reduces the cobalt and iron levels to 0.005 and 0.001 gpl, respectively. The aqueous strip from the organic contained 11.9 gpl cobalt and 4.6 gpl iron. This liquor can be worked up by known means to recover a high purity cobalt product.

Preciptation of vanadium redcake from the raffinate reduces the V$_2$O$_5$ to 0.18 gpl in the liquor and produces a redcake with 53.8% V and low levels of Ni, Co, and Fe. Solvent extraction of the barren liquor after redcake precipitation reduces the V from 0.18 to 0.012 gpl.

EXAMPLE VIII

This example demonstrates the precipitation of redcake from pregnant liquor, followed by the selective extraction of cobalt, iron and residual vanadium from the barren liquor and the selective stripping of cobalt from the loaded organic.

Pregnant liquor from Example III was treated with sodium chlorate and caustic as in Example VI, to precipitate vanadium pentoxide. The vanadium barren liquor was then solvent extracted in a laboratory shake-out test with 10% TIOA in Aromatic 150. Extraction was carried out at an organic to aqueous ratio of 2:1 and the stripping of the loaded organic was carried out with water at a organic to aqueous ratio of 20:1. The analysis are summarized in the Table 9.

TABLE 9

| | Analysis % or gpl | | | | | |
|---|---|---|---|---|---|---|
| | Ni | Co | Mo | V | Al | Fe |
| Liquor | | | | | | |
| Head | .4 | 2.8 | 1.1 | .8 | 60 | 2.0 |
| After $V_2O_5$ | .4 | 2.3 | .3 | .06 | 53 | 1.6 |
| Co/V Raffinate | .4 | .06 | .12 | .01 | 56 | .01 |
| Loaded Organic | .001 | 1.26 | .12 | .023 | .003 | .9 |
| Co selective strip | .02 | 25.0 | — | .06 | .06 | .03 |
| Solids | | | | | | |
| $V_2O_5$ | .05 | .5 | 3.1 | 5.6 | 18.4 | 6.4 |

The barren liquor after redcake precipitation contained 0.06 gpl V. The redcake precipitate had a high level of aluminum relative to vanadium. This has resulted because the original head liquor derived from catalyst A-1 had a relatively low vanadium content in the pregnant liquor but a high aluminum concentration during redcake precipitation. Solvent extraction of the vanadium barren liquor reduces the cobalt to 0.06 gpl and the vanadium to 0.01 gpl. The loaded organic contained 1.26 gpl Co and 0.023 gpl V. Selective stripping of the loaded organic produced a cobalt strip liquor with 25.0 gpl Co and only 0.06 gpl V and 0.03 gpl Fe.

EXAMPLE IX

This example demonstrates the effect of final pH and staged addition of sodium bisulfide on the completeness of precipitation of nickel and cobalt sulfides from pregnant liquor under atmospheric pressure.

Samples (0.5 liter) of pregnant liquor from Example III were heated to 175° F. and then a caustic soda solution saturated with $H_2S$ (i.e. sodium bisulfide solution) was added, under atmospheric pressure, until the desired final pH was obtained. The slurry was aged for 30 minutes under atmospheric pressure and then the nickel and cobalt sulfides were filtered off. For the staged addition of sulfide an initial quantity of sodium bisulfide solution was added to increase the pH to 1.5 or 1.75 and after aging, the nickel and cobalt sulfide were filtered off. The filtrate was then reheated to 175° F. and an additional quantity of sodium bisulfide added to produce the final pH of 1.75 or 2. After additional 30 minute aging, the nickel and cobalt sulfides were filtered off. The results are given in Table 10.

TABLE 10

| | Analysis % or gpl | | | | | |
|---|---|---|---|---|---|---|
| | pH | Ni | Co | Mo | V | A |
| Liquor | | | | | | |
| Head | −1 | 10.3 | 2.1 | .04 | 32 | 41 |
| Single Stage | | | | | | |
| Final | 1.0 | 4.7 | 1.0 | .008 | 26.0 | 34 |
| Final | 1.5 | .3 | .05 | .002 | 26.4 | 35 |
| Final | 2.0 | .1 | .02 | .008 | 24.0 | 32 |
| Two Stage | | | | | | |

TABLE 10-continued

| | Analysis % or gpl | | | | | |
|---|---|---|---|---|---|---|
| | pH | Ni | Co | Mo | V | A |
| Initial | 1.5 | 2.2 | .4 | .008 | 26.2 | 32 |
| Final | 2.0 | .04 | .009 | .008 | 22.3 | 28 |
| Three Stage | | | | | | |
| Initial | 1.5 | .3 | .08 | .004 | 24.0 | 31 |
| Inter. | 1.75 | .1 | .04 | .003 | 22.1 | 28 |
| Final | 2.0 | .01 | .005 | .003 | 22.2 | 28 |
| Solids | | | | | | |
| Single Stage | | | | | | |
| Final | 1.0 | 38 | 7.4 | .3 | .4 | .1 |
| Final | 1.5 | 37 | 7.1 | .2 | 1.7 | 1.0 |
| Final | 2.0 | 30 | 6.2 | .1 | 4.6 | 3.9 |
| Two Stage* | | | | | | |
| Initial | 1.5 | 40 | 7.7 | .2 | 1.3 | .1 |
| Final | 2.0 | 39 | 7.9 | .07 | 2.0 | .5 |
| Three Stage* | | | | | | |
| Initial | 1.0 | 37 | 7.4 | .2 | 2.2 | .6 |
| Inter. | 1.75 | 21 | 4.8 | .02 | 6.9 | 7.2 |
| Final | 2.0 | 2 | .5 | .007 | 10.7 | 19.1 |

*Ni/CoS filtered off after each stage

It is seen that as the final pH of sulfided solution was increased from 1 to 2, the completeness of nickel and cobalt precipitation improved, but contamination of the nickel and cobalt sulfides precipitates with aluminum also increased. Use of three-stage or two-stage precipitation also improves completeness of nickel and cobalt precipitation. Although high concentrations of aluminum are apparent in the final precipitates from the two-and-three-stage procedure the overall amount of aluminum precipitated with nickel was less than that from the single-stage precipitation procedure. The amount of vanadium coprecipitation with the nickel and cobalt sulfides was in the range 2% to 6% of the total V in solution.

EXAMPLE X

This example demonstrates the precipitation of nickel, and cobalt sulfides from pregnant liquor under pressure-sulfide precipitation. A 400 ml sample of pregnant leach liquor from Example IV was placed in a one liter laboratory autoclave. 25 mls of 50% of caustic solution was added and then the contents sealed and heated to 175° F. at which time hydrogen sulfide gas was introduced to a total pressure of 90 psig. The autoclave was agitated for one hour and then depressurized and the slurry filtered. The analysis of the barren liquor and precipitate is given in Table 11.

TABLE 11

| | Analysis % or gpl | | | | | | |
|---|---|---|---|---|---|---|---|
| | Ni | Co | Mo | V | Al | Fe | pH |
| Liquor | | | | | | | |
| Head | 6.0 | 1.2 | .03 | 18.5 | 24 | .5 | — |
| After Ni/CoS | .03 | .07 | .04 | 15.6 | 23 | .5 | 2.4 |
| Solids | | | | | | | |
| Ni/CoS | 29.7 | 5.2 | .07 | 7.6 | 1.7 | .3 | — |

The nickel and cobalt in the liquor were reduced to 0.03 and 0.07 gpl respectively. The nickel and cobalt sulfide precipitate contained 29.7% Ni and 5.2% Co. Coprecipitation of vanadium with the sulfides amounts to about 10% of the contained vanadium.

Pressure-sulfide precipitation of nickel and cobalt from pregnant liquor with high levels of vanadium therefore tends to carry down higher levels of vanadium than does atmospheric sulfide precipitation of nickel and cobalt.

EXAMPLE XI

This example demonstrates the ability to precipitate redcake on a pilot plant scale.

A 28-liter batch of pregnant liquor of Example IV was heated to 125° F. and 1.8 liter of 30% sodium chlorate solution and 3.8 liters of 50% caustic solution was then added in aliquots over a one hour period to oxidize and precipitate vanadium as redcake. The addition rates were controlled in order to maintain pH in the range 0–1 and EMF at 600–900 mv during the major part of precipitation. The slurry temperature increased to 180°–200° F. during precipitation because of the heat of reaction. Toward the end of precipitation period the pH was allowed to rise to 1.0–2. When addition of chlorate and caustic was completed, the slurry was aged for an additional one hour. The aging has been found to improve filterability and reduce the amount of sodium and aluminum coprecipitated with the redcake. A total of 12 runs were made under varying conditions and the results of four runs under the preferred conditions are summarized in Table 12.

TABLE 12

| | Analysis % or gpl | | | | | | | | |
|---|---|---|---|---|---|---|---|---|---|
| | Ni | Co | Mo | V | Al | Fe | Na | EMF | pH |
| Feed Solution | 8.2 | 1.6 | .02 | 27.8 | 34.9 | .9 | .6 | +20 | 0 |
| Barren Solution | 6.5 | 1.3 | .001 | .25 | 26.3 | .004 | 50 | 780 | 2.0 |
| Red Cake | .2 | .06 | .04 | 44 | 3.0 | 1.4 | 1.5 | — | — |

The vanadium was reduced from 28 to 0.25 gpl in the barren liquor. The redcake contained 44% V, had low levels of Al and Na (3 and 1.5%, respectively). At the high vanadium to Fe ratio in the feed solution the iron was very effectively coprecipitated from solution and reduced to 0.004 gpl in the barren liquor.

During addition of sodium chlorate and caustic, vigorous agitation was maintained in order to avoid localized high concentrations of caustic which causes excessive precipitation of aluminum or high concentration of chlorate which causes chlorine and chlorine dioxide evolution.

EXAMPLE XII

This example demonstrates the precipitation of nickel and cobalt sulfides by sulfide precipitation under pressure from liquor after red cake precipitation.

Samples of barren liquor from Example XI were adjusted to pH 2–2.8 with 20% caustic and then an aliquot sealed in the 1-liter autoclave and heated to 175° F. and maintained at this temperature for one hour under 15 or 60 psig $H_2S$ pressure. The autoclave was then depressurized and the slurry removed and filtered and the filtrate and precipitate analyzed with the results summarized in Table 13.

TABLE 13

| | | Analysis %, gpl | | | | |
|---|---|---|---|---|---|---|
| | $H_2S$ Press | pH | Ni | Co | Al | S |
| Liquor | | | | | | |
| | Head* | 1.8 | 5.7 | 1.2 | 23 | |
| | 15 | 2.0 | .20 | .03 | 23 | |
| | | 2.5 | .02 | .001 | 24 | |
| | | 2.8 | .003 | .001 | 21 | |
| | 60 | 2.0 | .013 | .002 | 24 | |
| | | 2.5 | .015 | .01 | 23 | |

TABLE 13-continued

| | | Analysis %, gpl | | | | |
|---|---|---|---|---|---|---|
| | $H_2S$ Press | pH | Ni | Co | Al | S |
| | | 2.8 | .007 | .01 | 23 | |
| Solids (wet) | | | | | | |
| | 15 | 2.0 | 42 | 7.5 | .1 | 40.7 |
| | | 2.5 | 18 | 3.2 | .7 | 20.4 |
| | | 2.8 | 23 | 4.1 | .8 | 25.4 |
| | 60 | 2.0 | 16 | 2.7 | .3 | 28.0 |
| | | 2.5 | 14 | 2.4 | .5 | 18.3 |
| | | 2.8 | 13 | 2.5 | .7 | 19.1 |

Head Mo—.001 and V—.11gpl

Increasing the pH of precipitation from 2 to 2.8 improves the completeness of nickel precipitation. The amount of sulfur in the nickel and cobalt sulfide precipitate is somewhat above stoichiometric because of the residual sodium chlorate in the head liquor which is reduced and produces elemental sulfur from oxidation of $H_2S$.

EXAMPLE XIII

This example demonstrates the selective extraction of ferric iron from pregnant leach liquor with tributyl phosphate solvent extractant followed by selective solvent extraction of cobalt with trioctylamine from the raffinate. Solvent extraction was carried out continuously in the mixer settler units of Example VII.

The cell configuration for iron extraction was five extractant cells and three strip cells. The organic extractant was 10% tributyl phosphate in Exxon Aromatic 150 and the strip liquor was 0.2N HCl. The organic to aqueous ratios in the mixers was 1.5 to 1 in both extraction and strip solutions. The feed pregnant liquor rate was 30 mls per minute, the organic rate 45 mls per minute, and the strip liquor rate was 5 mls per minute. Prior to starting the solvent extraction run, a volume of pregnant liquor was adjusted to 10 grams per liter free acid and sodium chlorate added to increase the EMF to 720 mv and oxidize all ferrous iron to ferric iron. The solvent extraction was run at approximately 100° F. and four compaigns of approximately 8 hours each were run. The results of the solvent extraction with tributyl phosphate are given in Table 14.

TABLE 14

| | Analysis gpl | | | | | |
|---|---|---|---|---|---|---|
| | Ni | Co | Mo | V | Al | Fe |
| Feed Liquor* | 8.5 | 1.7 | .10 | 27.1 | 31.9 | 1.2 |
| Raffinate | 8.6 | 1.7 | .001 | 26.6 | 31.0 | .004 |
| Strip | .09 | .02 | .60 | .27 | .32 | 8.1 |

*EMF = + 700 M. V.

The results show that iron is effectively reduced from 1.2 gpl to 0.004 gpl, and a strip liquor produced with 8 gpl Fe but less than 1% of the Ni, Co, V content of the feed liquor. Coincidentally any small amount of molybdenum in the pregnant liquor is also extracted with the iron and removed from the raffinate.

The raffinate from the solvent extractant step with tributyl phosphate was reduced with $SO_2$ to EMF 400 mv in order to reduce any $V^5$ back to $V^4$ and was then solvent extracted with trioctylamine. The cell configuration was four extraction cells and two strip cells. Water was used as the strip solution and the organic extractant was 10% trioctylamine in Aromatic 150. The organic-to-aqueous ratio was maintained at 1.5:1 in both the extractant and strip cells. The feed liquor rate was 35 mls per minute and the strip liquor rate was 3.5 mls per minute. Operation was at 85° F. The solvent extraction of cobalt was fun four campaigns of approximately 12 hours each. The results are summarized in Table 15.

TABLE 15

| | Analysis gpl | | | | | | |
|---|---|---|---|---|---|---|---|
| | Ni | Co | Mo | V | Al | Fe | EMF |
| Feed Liquor | 7.4 | .7 | .002 | 24.4 | 32.2 | .01 | 410 |
| Raffinate | 7.4 | .02 | .002 | 24.8 | 33.0 | .004 | — |
| Strip | .03 | 7.8 | .004 | .19 | .08 | .03 | |

The cobalt is selectively extracted from 0.7 down to 0.02 gpl cobalt in the raffinate. The cobalt strip solution was 7.8 gpl cobalt with only a small amount of vanadium contamination [0.19 gpl vanadium.]

EXAMPLE XIV

This example illustrates the roasting of the primary molybdenum sulfide leach residue to convert it to molybdic oxide, leaching of this oxide calcine in hydrochloric acid, followed by solvent extraction of the molybdenum from the pregnant liquor and finally precipitation of molybdenum from the strip liquor of the solvent extractant step.

Molybdenum sulfide leach residues produced in Example III were roasted in a tray roaster for 6 hours at temperatures of 800°-1200° F. The flat trays of material were periodically raked to expose fresh unroasted material. Each batch size was approximately four pounds and a total of 350 lbs of material was roasted. The analysis of the head sulfide residue and the calcines for the individual catalyst residues are given in Table 16. The roast parameters were selected so that carbon would be oxidized down to less than 1.5% and sulfur to less than 1% sulfidic sulfur in the calcine.

TABLE 16

| | | Ni | Co | Mo | V | Al | Fe | C | S |
|---|---|---|---|---|---|---|---|---|---|
| X621 | Head | 4.5 | 2 | 12.5 | 4.5 | 3.5 | .7 | 30 | 25 |
| | Calcine | 7.5 | 4 | 25 | 8 | 6 | .6 | 1.2 | 3.4 |
| X-1 | Head | 5.5 | .1 | 10 | 7 | 5 | .5 | 33 | 24 |

TABLE 16-continued

| | | Ni | Co | Mo | V | Al | Fe | C | S |
|---|---|---|---|---|---|---|---|---|---|
| | Calcine | 10 | .2 | 21 | 14 | 10 | 1 | 1 | 3 |
| A-1 | Head | .2 | 1.7 | 16 | .3 | 2 | .7 | 20 | 10 |
| | Calcine | .2 | 3 | 25 | .3 | 7 | .4 | .1 | .3 |
| GC-106 | Head | 4.6 | 1 | 12.6 | 1 | 3 | .3 | 34 | 20 |
| | Calcine | 10 | 2 | 25 | 4 | 9 | .3 | 1.3 | 3.3 |

Pilot plant leaching of the molybdic oxide calcine was carried out in a single stage continuous leach operation. The leach apparatus comprised three cascaded, three-liter, stirred, baffled vessels. The fresh calcine and 31% HCl were fed to the first vessel and reacted slurry removed from the third vessel and filtered to recover the molybdenum pregnant liquor and the barren leach residue. Three campaigns of 12 hours each were carried out and the effect of retention times of 2.45, 3.5 and 4.4 hours investigated. The pulp density of the feed slurry was controlled to 40% solids and the leach temperature controlled at 195° F. The acid feed rate was controlled to provide a residual acid concentration in the pregnant liquor of 160-190 grams per liter HCl. High extractions can be achieved with lower final acid concentrations but the high acid level was desired in order to optimize the later solvent extraction step of molybdenum with tributyl phosphate. The results are summarized in Table 17.

TABLE 17

| | Retention Hrs. | Analysis % or gpl | | | | | | | |
|---|---|---|---|---|---|---|---|---|---|
| | | Ni | Co | Mo | V | Al | Si | Fe | HCL |
| Solids | | | | | | | | | |
| Head | — | 6.5 | 2.2 | 22.2 | 6.3 | 10.8 | 8.9 | .3 | — |
| Leach | | | | | | | | | |
| #1 | 2.45 | .8 | .4 | 2.2 | .8 | 15.2 | 30.0 | .2 | |
| #2 | 3.50 | .8 | .3 | 1.9 | .9 | 14.1 | 32.0 | .2 | |
| #3 | 4.4 | .7 | .3 | 1.5 | .8 | 12.1 | 33.3 | .2 | |
| Liquor Leach | | | | | | | | | |
| #1 | 2.45 | 11.7 | 4.1 | 39.8 | 11.0 | 10.1 | — | .5 | 171 |
| #2 | 3.50 | 13.5 | 4.3 | 42.9 | 11.8 | 12.5 | — | .6 | 162 |
| #3 | 4.4 | 11.2 | 3.4 | 34.3 | 9.2 | 10.6 | — | .6 | 188 |
| Recovery % (Mean) | | 95 | 95 | 97 | 95 | 52 | — | 83 | — |

The extractions of Ni,Co,Mo and V were all 95% or better. Increasing the retention time from 2.5 to 4.4 hours increased molybdenum extraction slightly. The pregnant liquor contained molybdenum concentrations of 34-43 gpl Mo and Ni,Co,V in proportionately lower concentrations.

Pregnant liquor from leaching of the individual calcines was subjected to solvent extraction with tributyl phosphate in conventional laboratory shakeout tests. The organic extractant was 15% tributyl phosphate in Aromatic 150. The extractant organic to aqueous ratio was 4:1 and the strip ratio was organic to aqueous 2:1. The strip liquor was water. The extraction was carried out at 80° F. The results are summarized in Table 18.

TABLE 18

| | | Ni | Co | Mo | V | Al | Free Acid |
|---|---|---|---|---|---|---|---|
| X621 | Feed | 18.5 | 8.3 | 63.4 | 8.7 | 4.7 | 180 |
| | Raffinate | 19.7 | 9.1 | .8 | 9.3 | 4.8 | |
| | Strip | .001 | .001 | 31 | .001 | .03 | |
| X-1 | Feed | 20.8 | .4 | 37.1 | 26.0 | 7.1 | 170 |
| | Raffinate | 21.2 | .3 | .2 | 25.9 | 7.4 | |
| | Strip | .001 | .001 | 17 | .4 | .04 | |

TABLE 18-continued

|  |  | Ni | Co | Mo | V | Al | Free Acid |
|---|---|---|---|---|---|---|---|
| A-1 | Feed | .2 | 5.5 | 45.0 | .3 | 5.9 | 200 |
|  | Raffinate | .3 | 5.5 | .2 | .3 | 5.8 |  |
|  | Strip | .001 | .001 | 21 | .001 | .03 |  |
| GC106 | Feed | 19.6 | 3.6 | 45.0 | 5.8 | 7.0 | 185 |
|  | Raffinate | 20.3 | 3.7 | .16 | 5.8 | 7.0 |  |
|  | Strip | .001 | .001 | 23 | .001 | .03 |  |

Better than 99% of the molybdenum was extracted and recovered in the strip liquor. Extraction of the other metals was less than 1% with one exception, X-1, where entrainment of aqueous phase is expected as the cause of the vanadium transferred to the strip liquor.

Molybdic oxide was recovered from the molybdenum strip liquors. A 500 ml volume of pregnant strip liquor was heated to 175° F. and ammonia solution added slowly to adjust the pH to 0.5. Molybdic oxide precipitated and the slurry was aged for an additional hour before filtration and washing of the precipitate. The analyses of the pregnant strip liquor and the molybdic oxide precipitate are given in Table 19. The oxide precipitate contains 64.2% Mo and vanadium contamination is only 0.02%. Introduction of a washing step between extraction and stripping of the organic would reduce contamination of the molybdenum by vanadium and aluminum.

TABLE 19

|  | Ni | Co | Mo | V | Al | Fe |
|---|---|---|---|---|---|---|
| Pregnant strip, gpl | .001 | .005 | 24.3 | .06 | .001 | .1 |
| Mo O$_3$ pptn, % | .0001 | .001 | 64.2 | .02 | .7 | .05 |

EXAMPLE XV

This example demonstrates the recovery of molybdenum and the Ni+Co+V in the primary leach residue by pressure leaching of the residue with oxygen in a sodium carbonate solution.

A 100 gram sample of wet leach residue from example 3 was slurried in 0.5 liter of 20% sodium carbonate solution, the slurry was contained in a one liter autoclave heated to 300° F. and then oxygen introduced at a pressure of 120 psig with vigorous agitation of the slurry. Leaching was continued for 3 hours. The autoclave was cooled and the leached slurry filtered. The filtrate comprised the caustic pregnant leach liquor rich in molybdenum and vanadium. The leach residue was washed with water and then acid leached at 180° F. at atmospheric pressure with 0.5 liter of 100 grams per liter hydrochloric acid. The acid slurry was filtered and the acid liquor comprised the nickel-cobalt-rich liquors which were recycled to primary leach while the residue constituted the final barren residue from leaching of the spent catalyst which is discarded to tails.

Separate leach tests were run on leach residues from three catalysts produced in Example III the results are given in Table 20.

TABLE 20

|  | Analysis % gpl or Extraction % | | | | |
|---|---|---|---|---|---|
|  | Ni | Co | Mo | V | Al |
| Sodium Carb. Liquor (gpl) |  |  |  |  |  |
| X-621 | .001 | .002 | 19.8 | 3.7 | .09 |
| X-1 | .001 | .002 | 18.7 | 9.0 | .2 |
| A-1 | .001 | .002 | 28.5 | .11 | .05 |

TABLE 20-continued

|  | Analysis % gpl or Extraction % | | | | |
|---|---|---|---|---|---|
|  | Ni | Co | Mo | V | Al |
| Residue (%)* |  |  |  |  |  |
| X-621 | .14 | .06 | .35 | .13 | 3.3 |
| X-1 | .57 | .04 | .43 | .94 | 1.6 |
| A-1 | .12 | .24 | .35 | .11 | 1.4 |
| Recoveries + (%) |  |  |  |  |  |
| X-621 | 96.5 | 99.7 | 97.3 | 99 | — |
| X-1 | 94 | — | 95.5 | 88 | — |
| A-1 | — | 96 | 97.8 | — | — |

*Residue after acid leach
+Mo recovery in caustic solution; Ni, Co, V recovery in caustic + acid solution The recovery of molybdenum in the sodium carbonate leach liquor was 95–98% with essentially no nickel or cobalt dissolved. The recovery of the nickel and cobalt in the acid leach liquor was 94–99.7%. Approximately 60% of the vanadium was recovered in the sodium carbonate liquor and the remainder in the acid leach liquor.

On adjusting the pH of the carbonate leach liquor to 3 and reducing the vanadium valence state from 5 to 4 with SO$_2$, the molybdenum could be solvent extracted from the liquor with trioctylamine with very little contamination from vanadium.

EXAMPLE XVI

This example demonstrates pressure leaching of molybdenum sulfide primary leach residues in sodium hydroxide solution.

The experimental procedure was similar to that for Example XV except that 20% caustic solution was used in place of 20% sodium carbonate solution. Residue from leaching of X621 catalyst of Example III was used as the head material. The results are given in Table 21.

TABLE 21

|  | Analysis/Extraction | | | | |
|---|---|---|---|---|---|
|  | Ni | Co | Mo | V | Al |
| Head, % | 3.3 | 1.6 | 13.4 | 2.5 | 2.2 |
| Caustic Leach Liquor, gpl | .001 | .004 | 20.1 | 5.0 | 1.8 |
| Residue % | 6.0 | 2.5 | .1 | .2 | 2.4 |
| Extraction, % | 0 | 0 | 99.5 | 96 | 40 |

The extraction of molybdenum and vanadium was 99.5% and 96%, respectively; extraction of nickel and cobalt was essentially zero. The extraction of aluminum was 40% into the caustic solution in contrast to the 3% extraction of aluminum in the sodium carbonate-leach liquor.

EXAMPLE XVII

This example demonstrates the precipitation of calcium phosphate from the aluminum liquor after removal of all other metal impurities.

To a 100 ml solution of aluminum chloride which contained 25 gpl Al and 3.0 gpl P as phoshoric acid was added the required volume of caustic solution to give a mole ratio of Na:Al of 7 or 4.7 in the solution. The solution was stirred at 160° F. to allow complete redissolution of any precipitated aluminum oxide hydrate and produce a clear sodium aluminate solution. To this solution 20 mls of 15% calcium chloride solution was added and immediate precipitation of calcium phosphate occurred. The slurry was aged for 30 minutes at 160° F. and then filtered and samples of barren liquor and precipitate analyzed. The precipitate was washed in water and then reanalyzed. The results are given in Table 22.

TABLE 22

|  |  | Analysis, % or gpl |  |  |  |  |
|---|---|---|---|---|---|---|
|  |  | Al | P | Ca | Na | M.R Na:Al |
| Barren Liquor | (1) | 16.8 | .007 | .003 | 91 | 7 |
|  | (2) | 16.8 | .005 | .003 | 62 | 4.7 |
| Precipitate | (1) | 3.0 | 8.3 | 27.5 | 12.2 | 7 |
|  | (2) | 3.1 | 6.3 | 18.9 | 9.7 | 4.7 |
| Precipitate, washed | (1) | 1.7 | 12.8 | 40.0 | 1.0 |  |

Calcium selectively precipitates the phosphate from 3.0 grams per liter down to 0.005–0.007 gpl phosphorus in solution. The initial precipitate contains significant levels of aluminum oxide hydrate and sodium chloride which has coprecipitated because of the lower solubility of sodium chloride in caustic solution. Washing of this precipitate removes most of the sodium chloride and much of the aluminum oxide hydrate contamination.

EXAMPLE XVIII

This example demonstrates the solvent extraction recovery of vanadium from primary pregnant liquor with trioctylphosphine oxide [TOPO].

Raffinate from solvent extraction of cobalt and ferrous iron of Example VII was used as the feed material and the TOPO solvent extraction of vanadium was run in the pilot plant mixer-settler units similar to those of Example VII. The cell configuration was six extraction cells and four strip cells. Stripping was with in 2N HCl. The organic extractant was 10% TOPO in Aromatic 150. The pregnant liquor feed rate was 15 mls per minute, organic was 150 mls per minute and strip liquor was 15 mls per minute. Prior to starting the solvent extraction run, the EMF of the feed liquor was adjusted to 700 mv in order to oxidize all trivalent vanadium up to tetravalent vanadium. Three campaigns of 6 hours duration were run. The results are given in Table 23.

TABLE 23

|  | Analysis gpl |  |  |  |  |  |
|---|---|---|---|---|---|---|
|  | Ni | Co | Mo | V | Al | Fe |
| Pregnant, Liquor | 13.2 | .004 | .024 | 44.8 | 52.7 | .02 |
| Raffinate | 12.0 | .004 | .015 | 2.4 | 48 | .001 |
| Strip | .03 | .003 | .001 | 43.8 | .09 | .001 |

The vanadium was selectively extracted from 44.8 gpl down to 2.4 gpl in the raffinate. The strip liquor contained 43.8 gpl with very low levels of the other metals. Additional laboratory shakeout tests demonstrated that additional reoxidization of the raffinate to EMF 700 M.V allowed the remaining vanadium to be extracted from the raffinate with TOPO.

Preliminary work with shakeout tests of the TOPO solvent extractant showed that the total chloride level in pregnant liquor had to be above about 200 gpl in the pregnant liquor and all the vanadium had to be in the tetravalent state in order to reduce the vanadium levels to less than one gram per liter in the raffinate.

Those skilled in the art will understand that by the terms "catalyst", "hydrodesulfurization catalyst", "hydrodemetallization catalyst" "spent catalyst" and the like, as used in this specification and the appended claims, we mean and refer to those catalyst materials employed in refining procedures of natural crude oil or synthetic crude oil, i.e. liquified coal or bitumin from tar sands and oil shales which have been hydrotreated to give a synthetic crude oil, particularly hydrocracking and hydroprocessing operations. Thus, while the present invention process has special utility and value in application to the presently widely used desulfurization and demetalization catalyst, it can be used to advantage in treatment of any catalyst bodies of the same general composition. Such catalysts compositions comprise as indicated above, an alumina support, a Group VI B component and a Group VIII component those components being selected from the group consisting of the metals oxides and sulfides of the elements of Group VI B and Group VIII. The substrate material is generally of interest or concern only from the standpoint of effecting separation and recovery of the desired metal values in high yields of products of requisite purity. As indicated above, however, an important advantage of this invention is that the alumina of such catalyst materials can readily be recovered as a product of high purity. Other than alumina, the substrate may be any highly porous body capable of maintaining chemical and physical integrity under the conditions of use in refining operations. As in the case of alumina in the process described in detail above, such other substrate materials may impair or interfere with the metal value separations and recoveries, necessitating their separation and removal from the leach solution at an early stage.

It will be further understood that in using the terms "organic solvent", "petroleum solvent" and combinations thereof appropriate organic diluents for use in the solvent extraction steps of this invention are meant and intended. Such organic diluents consequently are those in which the organic extractant of choice and the metal-extractant complex are soluble to provide a uniform solution and also not soluble in nor reactive with either the leach solution or the strip solution with which it is to be used in this process. Thus methyl alcohol and similar relatively low molecular weight compounds are not preferred for such use. Rather the diluents which are suitable are aromatic compounds such as that specified above as A 150 which is a mixture of aromatic components of 9–11 carbon atoms marketed by Exxon Company, U.S.A. under the trademark designation AROMATIC 150. Alternatively, kerosine solvents such as kermac 500T solvent of the Kerr Magee oil Corporation which contains about 10% aromatic compounds are also suitable.

In this specification and in the appended claims where the ratios and percentages are stated reference is to the weight basis unless otherwise specified.

What is claimed is:

1. The method of recovering vanadium, iron, nickel, cobalt, aluminum, molybdenum and tungsten metal values from spent hydrodesulphurization catalyst additionally containing carbon and silicon which comprises the steps of contacting the catalyst with aqueous HCl at temperature near the aqueous acid boiling point in a primary leach stage and thereby dissolving substantially all the values of metals other then molybdenum and tungsten, separating and removing the resulting primary acid leach solution from the primary leach residue consisting mainly of molybdenum sulfide or tungsten values, carbon and silicon, removing from the primary acid leach residue substantially all the molybdenum and tungsten values, adding caustic soda and an oxidant to the primary acid leach solution and thereby precipitating vanadium and iron contained in the said solution in the form of redcake in which the vanadium is in the pentavalent state, separating and removing the redcake from the liquid phase, contacting the resulting substantially vanadium-free solution with a source of sulfur selected from the group consisting of sodium sulfide, sodium hydrogen sulfide and a combination of hydrogen sulfide and caustic soda and thereby precipitating nickel sulfide and cobalt sulfide, separating the resulting solid phase from the liquid phase, and recovering aluminum values from the liquid phase.

2. The method of claim 1 including the step of removing from the leach solution substantially all the iron values before adding the oxidant and caustic soda thereto.

3. The method of claim 1 in which the catalyst contains phosphorus including the step of removing phosphorus as a phosphate precipitate from the liquid phase by adding calcium chloride or barium chloride after separation and removal of nickel and cobalt sulfides from the liquid phase and then adding caustic soda to raise the liquid phase pH to 11 to 12.

4. The method of recovering vanadium, iron, nickel, cobalt, aluminum, molybdenum and tungsten metal values from spent hydrodesulphurization catalyst which comprises the steps of contacting the catalyst with aqueous HCl at temperature near the aqueous acid boiling point and thereby dissolving substantially all the values of metals other then molybdenum sulfide or tungsten values, carbon and silica, adding to the leach solution a source of sulphur selected from the group consisting of sodium sulfide, sodium hydrogen sulfide and a combination of hydrogen sulfide and caustic soda and thereby precipitating nickel and cobalt sulfides under atmospheric pressure while the solution pH is in the range of 1-2.5 separating and removing the resulting sulfide precipitate from the leach solution, then adding to the leach solution caustic soda and an oxidant and thereby precipitating vanadium and iron in the solution in the form of redcake in which the vanadium is in the pentavalent state, separating and removing the redcake from the liquid phase, and recovering aluminum values from the liquid phase.

5. The method of claim 4 including the steps of oxidizing the iron in the primary leach solution following separation of the nickel and cobalt sulfide therefrom, and then selectively removing the iron as ferric chloride from said solution by solvent extraction with tributyl phosphate.

6. The method of recovering metal values from spend hydrodesulphurization catalyst containing alumina, and sulfides of iron, cobalt, vanadium, nickel and molybdenum or tungsten which comprises the steps of contacting the catalyst with aqueous HCl at temperature near the aqueous acid boiling point as a primary acid leach stage and thereby dissolving substantially all the aluminum and other metal values except those of molybdenum or tungsten, separating and removing the resulting aluminum chloride primary acid leach solution from the primary acid leach residue consisting mainly of molybdenum sulfide or tungsten values, adding an oxidant to the liquid phase thereby oxidizing the iron to the ferric state, solvent extracting $FeCl_3$ from the solution, then adding a reducing agent to the solution so that all the vanadium contained therein is in the tetravalent state, then solvent extracting the cobalt from the solution, adding an oxidant and caustic soda to the raffinate of the cobalt extraction step and thereby precipitating the vanadium therein as redcake vanadium pentoxide, treating the liquid phase following separation of the redcake to a solvent extraction step for the removal of any vanadium values remaining therein, recycling the stripped vanadium extractant solution to the primary leach stage to recover the vanadium values therein, adding a source of sulfur to the raffinate of the vanadium extraction step thereby precipitating nickel values therein as nickel sulfide, separating the solid and liquid phases, and recovering the aluminum values from the liquid phase.

7. The method of claim 6 in which the source of sulfur for the nickel sulfide precipitation step is caustic soda containing $H_2S$, and in which the vanadium is stripped from the extractant in the form of $NaVO_3$ and is returned to the primary acid leach stage for recovery of vanadium values therein.

8. The method of recovering metal values from spent hydrodesulfurization catalyst containing alumina, and sulfides of iron, cobalt, vanadium, nickel and molybdenum or tungsten which comprises the steps of contacting the catalyst with aqueous HCl at temperature near the aqueous acid boiling point as a primary acid leach stage and thereby dissolving substantially all the aluminum and other metal values except those of molybdenum or tungsten, and separating and removing the resulting primary acid leach solution form the primary acid leach residue consisting mainly of molybdenum sulfide or tungsten values, oxidizing the iron contained in the solution to the ferric stage, selectively removing the ferric iron from the liquid phase, then oxidizing the vanadium contained in the liquid phase to pentavalent form and precipitating it as redcake, separating and removing the redcake from the liquid phase, selectively separating and removing cobalt from the liquid phase following redcake separation, then adding a source of sulfur to the liquid phase and thereby precipitating the nickel as nickel sulfide, separating the nickel sulfide product from the liquid phase and finally recovering aluminum values from the liquid phase.

9. The process of claim 8 in which the liquid phase following separation and removal of cobalt is treated with NaHS for precipitation of nickel as nickel sulfide and in which the liquid phase following the separation of nickel sulfide precipitate is treated with caustic soda to precipitate the aluminum values therein in the form of hydrated aluminum oxide, and in which the hydrated aluminum oxide product is separated from the liquid phase.

10. The method of recovering metal values from spent hydrodesulfurization catalyst containing alumina and sulfides of iron, cobalt, vanadium, nickel, molybdenum or tungsten which comprises the steps of contacting the catalyst with aqueous HCl at temperature near the aqueous acid boiling point as a primary acid leach stage and thereby dissolving all the aluminum and other metal values except those of molybdenum or tungsten, separating and removing the resulting primary acid leach solution from primary acid leach residue, oxidizing the iron in the said leach solution to the ferric state, selectively removing the iron in the ferric state from the solution, oxidizing the vanadium to the pentavalent state and precipitating redcake, separating the redcake from the liquid phase, selectively removing cobalt from the liquid phase, then selectively removing nickel from the liquid phase, and finally recovering the aluminum values from the barren solution following the removal of the nickel values therefrom.

11. The method of recovering molybdenum, cobalt, nickel, and vanadium values from spent hydrorefining catalyst containing Group VIB and iron group metals in the sulfide form which comprises the steps of contacting the catalyst with aqueous HCl at temperature near the aqueous acid boiling point in a primary acid leach stage and thereby dissolving substantially all the values of metal other than those of molybdenum and tungsten, separating and removing from the primary acid solution the resulting primary acid leach residue consisting mainly of molybdenum sulfide, removing from the primary acid leach residue substantially all the molybdenum values, contacting the resulting substantially molybdenum-free leach solution with a first solvent extractant and thereby extracting the cobalt and iron values contained therein, contacting the raffinate from the cobalt and iron solvent extraction step with an oxidant and thereby oxidizing the vanadium values thereof to the tetravalent state, contacting the resulting solution with a second solvent extractant and thereby extracting the vanadium values in the said solution, then recovering the nickel values in the vanadium extraction raffinate, and finally recovering the aluminum values from the barren liquor remaining after the nickel separation and removal.

12. The method of claim 11 in which NaHS is added to the vanadium solvent extraction raffinate to precipitate metal values therein in the form of NiS, and in which NaOH is added to the barren liquor remaining after removal of the NiS precipitate to precipitate the aluminum values of the barren liquor in the form of hydrated aluminum oxide.

* * * * *